United States Patent [19]
Fukuda et al.

[11] Patent Number: 5,452,019
[45] Date of Patent: Sep. 19, 1995

[54] PROJECTED IMAGE DISPLAYING APPARATUS AND A METHOD OF CORRECTING COLOR UNEVENNESS THEREIN

[75] Inventors: Hidenori Fukuda, Utsunomiya; Hirokazu Hayashi, Yaita, both of Japan

[73] Assignee: Sharp Kabushiki Kaisha, Osaka, Japan

[21] Appl. No.: 140,552

[22] Filed: Oct. 25, 1993

[30] Foreign Application Priority Data

Oct. 30, 1992 [JP] Japan .................. 4-292621

[51] Int. Cl.⁶ .................. H04N 9/73; H04N 3/23
[52] U.S. Cl. .................. 348/655; 348/658; 348/745
[58] Field of Search .............. 348/180, 189, 190, 191, 348/744, 745, 746, 747, 750, 751, 806, 807, 655, 656, 657, 658, 759, 760, 761, 766; H04N 17/00, 17/02, 17/04, 5/66, 9/73, 3/22, 3/23, 3/233; 315/368.11, 368.12, 368.13, 370

[56] References Cited

U.S. PATENT DOCUMENTS

| | | | |
|---|---|---|---|
| 4,485,394 | 11/1984 | Ghaem-Maghami . | |
| 4,746,970 | 5/1988 | Hosokawa et al. | 348/658 |
| 4,827,334 | 5/1989 | Johnson et al. . | |
| 4,962,418 | 10/1990 | Kamaga | 358/29 |
| 4,963,828 | 10/1990 | Kawame et al. | 358/10 |
| 5,231,481 | 7/1993 | Eouzan et al. | 358/60 |

FOREIGN PATENT DOCUMENTS

| | | | |
|---|---|---|---|
| 0198692 | 10/1986 | European Pat. Off. | H04N 17/02 |
| 448480 | 3/1991 | European Pat. Off. . | |
| 0440216 | 8/1991 | European Pat. Off. | H04N 9/73 |
| 474420 | 8/1991 | European Pat. Off. . | |
| 58-151175 | 9/1983 | Japan . | |
| 60-154795 | 8/1985 | Japan . | |
| 0220092 | 9/1987 | Japan | H04N 17/4 |
| 63-037785 | 2/1988 | Japan . | |
| 0037785 | 2/1988 | Japan | H04N 5/66 |
| 4196994 | 7/1992 | Japan . | |
| WO9115931 | 10/1991 | WIPO . | |

Primary Examiner—James J. Groody
Assistant Examiner—Michael H. Lee

[57] ABSTRACT

A chromaticity meter measures chromaticity of light output for each of picture elements selected. Calculated from the measurement is corrective data on each of RGB colors, which in turn used to calculate corrective data on each of RGB at unselected picture elements. In this method, original video signals for each of RGB colors will be correctively modulated based on the thus obtained corrective data. A projected image displaying apparatus is constructed such that adjustment of chromaticity as to white as well as to black from the measurement by the chromaticity meter of chromaticity throughout the entire image, is carried out uniformly and reliably by automatic control using a microcomputer so as to determine optimal condition for correctively modulating the original video signal. This apparatus further includes means for storing the thus obtained optimal condition in a non-volatile memory.

6 Claims, 17 Drawing Sheets

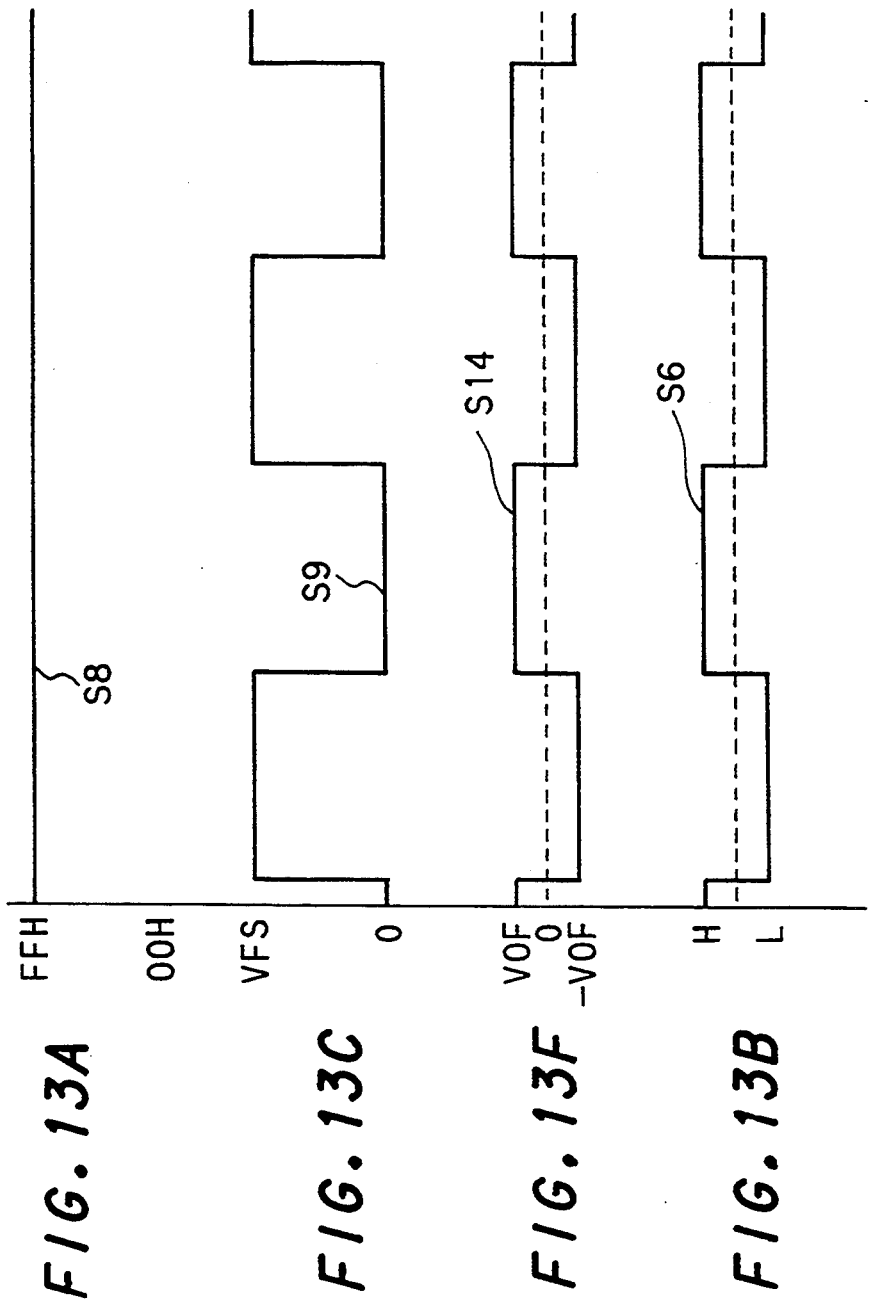

| REGION | CONTROL STEP 1 | CONTROL STEP 2 |
|---|---|---|
| ① | G | R |
| ② | B | G |
| ③ | B | R |

| REGION | CONTROL STEP 1 | CONTROL STEP 2 |
|---|---|---|
| ④ | G | R |
| ⑤ | B | R |
| ⑥ | B | G |

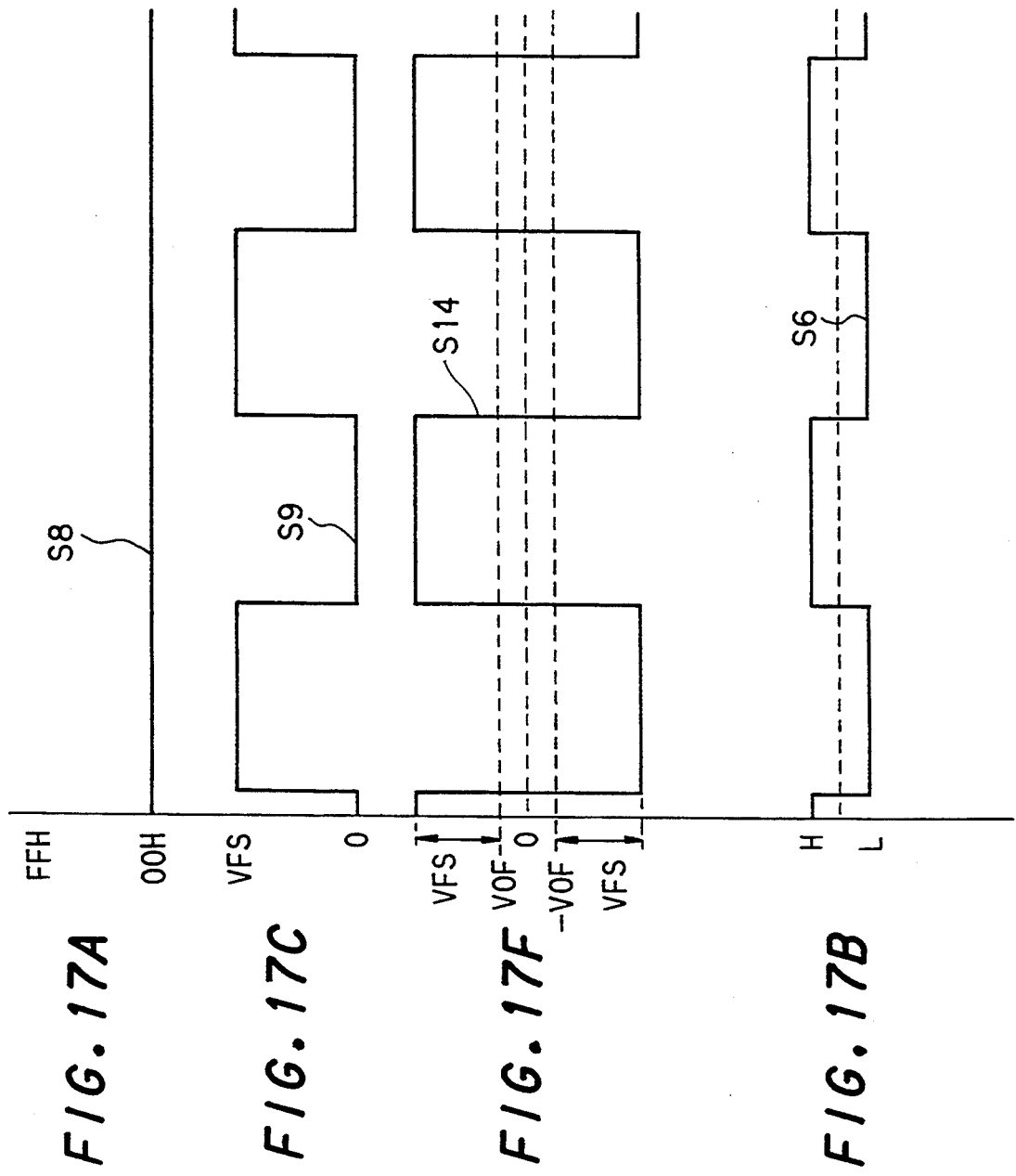

PROJECTED IMAGE DISPLAYING APPARATUS AND A METHOD OF CORRECTING COLOR UNEVENNESS THEREIN

BACKGROUND OF THE INVENTION (1) Field of the Invention

The present invention relates to a projected image displaying apparatus using a plurality of display devices, and further the present invention relates to a method of correcting color unevenness in a projected image displaying apparatus wherein color unevenness over the entire display image can be corrected, and to a display apparatus capable of automatically effecting chromaticity adjustment that is to be performed at a production stage, etc.

(2) Description of the Prior Art

In projected image displaying apparatuses using a plurality of display devices, it is required to strictly control characteristics of display elements in order to establish uniformity of chromaticity throughout the entire display image, but the chromaticity throughout the projected image varies position to position depending upon color rendering properties of a light source used, a color separation/composition system used for the light source and transmittance distribution of the display elements and other factors. Therefore it very difficult in a technological view point to establish such a strict control in a projected image display apparatus.

There is a method called "white-balance adjusting method" in which a video signal is composed of red, blue and green component video signals (which will hereinafter be referred to as R-signal, G-signal and B-signal, respectively), and amplitude of each component is variable so as to effect gain-control, whereby chromaticity can be adjusted roughly throughout the entire image.

Japanese Patent Application Laid-Open Sho 63 No.37,785 discloses a method of correcting unevenness of luminance and chromaticity arising in a case where an image screen is formed by arranging a plurality of liquid crystal display panels. This method comprises the steps of: measuring each liquid crystal display panel in its real mounted state on light intensity; generating data on uniformity ratio of illuminance for each liquid crystal display panel on the basis of the obtained light intensity so as to store the generated data in the memory; and executing a calculative operation based on the stored data and projected image data on each liquid crystal display panel so as to display a uniform projected image.

Now, a conventional chromaticity adjusting method will be explained with reference to FIG. 1, which is a block diagram showing a circuit for generating video signals to be provided for a typical liquid crystal display device. In this figure, γ-correcting circuits 55r, 55g and 55b are constructed identically, and analog converting circuits 56r, 56g and 56b are also constructed all identically like an analog converting circuit 56 shown in FIG. 2.

A video signal S1 having an analog value is inputted to a projected image processing section 54 in which the inputted data is separated into R-signal, G-signal and B-signal. The thus separated signals pass through A/D converting circuits 54′r, 54′g and 54′b respectively in the projected image processing section 54 to be formed into quantized digital video signals S1R, S1G and S1B, which are in turn sent out to γ-correcting circuits 55r, 55g and 55b.

The γ-correcting circuits 55r, 55g and 55b are to perform γ-correction for making compensation for voltage-transmittance characteristic of liquid crystal, and subject the inputted respective digital video signals S1R, S1G and S1B to γ-correction to output digital video signals SγR, SγG and SγB to analog converting circuits 56r, 56g and 56b, respectively.

The analog converting circuits 56r, 56g and 56b convert the inputted digital video signals SγR, SγG and SγB into analog values, respectively. The thus formed analog values are sent out as video signal SR, SG and SB to a liquid crystal display device/optical converting section 57.

The liquid crystal display device/optical converting section 57, based on the inputted video signal SR, SG and SB, reproduces an image and emits light output RAY.

A chromaticity meter receives the light output RAY emitted as an image from the liquid crystal display device/optical converting section 57, and measures the chromaticity thereof to indicate the measurement. Here, for convenience of description, liquid crystal display device used is assumed to be of a normally white type, more explicitly, the liquid crystal display device is assumed to lower its transmittance as the voltage applied increases. Further assumption is that the device is driven by an alternating voltage which has a center voltage of ground level and inverts its polarity for every horizontal line.

Next, description will be made of converting procedures of signal waveforms in the analog converting circuits 56r, 56g and 56b. FIG. 2 is a circuit diagram of the analog converting circuit 56. There are three analog converting circuits 56 on the diagram shown in FIG. 1, namely, analog converting circuit 56r for processing the R-signal, analog converting circuit 56g for processing the G-signal and analog converting circuit 56b for processing the B-signal. Here, FIGS. 3A through 3F are diagrams showing waveforms of video signals for different points in 56.

As shown in FIG. 3B, a control signal S6 has a waveform taking a peak value, or voltage H for 'High' level and taking another peak value, or voltage L for 'Low' level, and alternating between 'High' level and 'Low' level, periodically. This signal is inputted into a logical circuit 62, switches SW1, SW2 and SW3, and serves as a synchronizing signal.

When the control signal S6 is at 'High' level in switches SW1, SW2 and SW3, all terminals 'c' are simultaneously connected with respective terminals 'b' and are simultaneously disconnected with respective terminals 'a'. On the other hand, when the control signal S6 is at 'Low' level, all terminals 'c' are simultaneously connected with respective terminals 'a' and are simultaneously disconnected with respective terminals 'b'.

In the switch SW1, the terminal 'a' is applied with a full-scale voltage VS that is adjusted by a variable resistance R1 whereas the terminal 'b' is grounded. As previously described, the terminals 'a' and 'b' are alternately connected with the terminal 'c' following the control signal S6 inputted to a terminal 'd'. With the alternating connection, the terminal 'c' generates a pulse having a peak value equal to the full-scale voltage VFS and launches the pulse as a signal S11 to a negative (−)terminal of an amplifier AMP1. The signal S11 inputted to the (−)terminal of the amplifier AMP1 is therein multiplied by (−1) to output a waveform shown in FIG. 3D.

In the switch SW2, the terminal 'a' is applied with an offset voltage VOF that is adjusted by a variable resistance R2 whereas the terminal 'b' is grounded. As previously described, the terminals 'a' and 'b' are alternately connected with the terminal 'c' following the control signal S6 inputted to a terminal 'd'. With the alternating connection, the terminal 'c' generates a pulse having a peak value equal to the offset voltage VOF and launches the pulse as a signal S16 to a positive (+)terminal of an amplifier AMP3. In the switch SW3, the terminal 'b' is applied with an offset voltage VOF that is adjusted by a variable resistance R2 whereas the terminal 'a' is grounded. As previously described, the terminals 'a' and 'b' are alternately connected with the terminal 'c' following the control signal S6 inputted to a terminal 'd'. With the alternating connection, the terminal 'c' generates a pulse having a peak value equal to the offset voltage VOF and launches the pulse as a signal S17 to a negative (−)terminal of the amplifier AMP3. Accordingly, these signals S16 and S17 synchronize with each other, but are logically inverted one another, or more specifically, when the signal S16 stays at 'High' level, the signal S17 is at 'Low' level.

The AMP3 subtracts the signal S17 inputted into the (−)terminal from the signal S16 inputted into the (+)terminal, and outputs the resultant signal S13 to a (−)terminal of an amplifier AMP2.

A digital video signal S8 corresponds to any one of the digital video signals SγR, SγG and SγB that have been quantized by and outputted from γ-correcting circuit 55 $r$, 55$g$ and 55$b$. By the way, the γ-correcting circuit 55 $r$, 55$g$ and 55$b$ execute conversion of an inputted signal to form an output in accordance with a characteristic curve shown in FIG. 4C, therefore, the digital video signal S8 is supplied to a logical circuit 62 as having a waveform taking a certain constant voltage VP shown in FIG. 3A as a peak value.

The logical circuit 62 also receives a signal S6 alternately reversing at intervals of one horizontal period as having a waveform shown in FIG. 3B, and effects a logical operation between the signal S6 and the digital video signal S8, whereby the digital video signal S8 is converted into digital video signal data series D0, D1, D2, (where the digital video signal S8 is digitized to indicate waveform constituents as it is and as inverted alternately every one horizontal period) as shown in FIG. 3AA to be outputted to a D/A converter 59.

The D/A converter 59 receives at its referential voltage input terminal VREF an input of full-scale voltage VFS that has been adjusted by means of the variable resistance R1, and based on the input, converts the inputted video signal data series D0, D1, D2, . . . into a corresponding analog signal, so as to form a video signal S9 having a waveform with the full-scale voltage VFS as a peak value as shown in FIG. 3C. The thus generated signal S9 is outputted from an output terminal VOUT to a (+)terminal of the amplifier AMP1.

The amplifier AMP1 subtracts the signal S11 from the signal S9, and the resultant is outputted as a signal S12 to a (+)terminal of the amplifier AMP2. The signal S9 has a waveform shown in FIG. 3C and the signal S11 multiplied by (−1) takes a waveform shown in FIG. 3D. Accordingly, the signal S12 will have a waveform shown in FIG. 3CC formed by the sum of the waveform shown in FIG. 3C and the waveform shown in FIG. 3D.

The amplifier AMP2 subtracts the signal S13 from the signal S12, and the resultant is outputted as a video signal S14 to the liquid crystal display device/optical converting section 57. This video signal S14 corresponds to any one of the video signals SR, SG and SB. The signal S12 has a waveform shown in FIG. 3CC, and the signal S13 multiplied by (−1) takes a waveform shown in FIG. 3E. Therefore, the signal S14 will have a waveform shown in FIG. 3F formed by the sum of the waveform shown in FIG. 3E and the waveform shown in FIG. 3E.

As mentioned above, it is difficult for the conventional white-balance adjustment to inhibit the color unevenness in the image occurring due to the dispersion of individual device elements on the display image. On the other hand, the object of Japanese Patent Application Laid-Open Sho 63 No.37,785 cited above is to make correction between liquid crystal display panels arranged, therefore no irregularity or unevenness within the image cannot be corrected.

Besides, in accordance with the configuration shown in FIG. 1, a display apparatus is constructed by three liquid crystal display devices for red, green and blue (which will hereinafter be referred to as R, G and B, respectively, and the three color, red, green and blue will be referred to as RGB.) having three respective circuits one for each. Therefore, these circuits are to involve dispersion in their circuit constants, and the three liquid crystal display devices must also have dispersion in voltage-transmittance characteristics. Such dispersion causes disadvantageous effects such as coloring an area that should be displayed in achromatic color like black and white. This disadvantage necessitates individual adjustment of the offset voltage VOF and the full-scale voltage VFS for each circuit.

In the prior art, this adjustment required the following procedures. Initially, data-input is made of a predetermined projected image such as, for example, a blank pattern for making pure white display on an entire image screen. Then, while the projected output generated by the optical conversion from the read data image should be measured using a chromaticity meter 58, the amplitude of the signals provided for the liquid crystal devices and the bias, more clearly, the full-scale voltage VFS and the offset voltage VOF for each device should be controlled by varying the variable resistance R1 for governing the full-scale voltage VFS and the resistance of the variable resistor R2 for governing the offset voltage VOF for each color block, so as to adjust the colorbalance such as black and white.

However, this procedure requires an extremely fine adjustment and to make matters worse, it is very difficult to distinguish what resistors of which color block should be adjusted in what degree from the observed deviation of chromaticity. Therefore this method required even a skilled operator to take a very long time for the adjustment, posing a difficulty in production.

SUMMARY OF THE INVENTION

The present invention is to eliminate the above problems and it is therefore an object of the present invention to provide a projected image displaying apparatus wherein irregularity and unevenness on an image screen is eliminated by making correction in accordance with the chromaticity distribution on the image screen and provide a correcting method for the apparatus.

Another object of the present invention is to provide a displaying apparatus capable of automatically conducting chromaticity adjustment and a system therefor.

In order to achieve the above objects, the present invention is configured as follows.

First of all, a projected image displaying apparatus of the present invention for forming images by projecting on a screen three kinds of lights corresponding to the primary color components of video signals, comprises:
   chromaticity measuring means for measuring chromaticity at arbitrary coordinate points on the screen;
   first operating means for calculating first corrective data on each of the primary color components uniquely from the chromaticity at the coordinate points measured by the chromaticity measuring means;
   memory means for storing the first corrective data in association with the coordinates of the points at which chromaticity has been measured;
   second operating means reading out the first corrective data in association with a plurality of coordinate points from the memory means and calculating, based on the read-out first corrective data, second corrective data used for correctively modulating video signals to be applied to display elements emitting three primary color components in order to form picture elements at which no measurement of chromaticity was made; and
   correctively modulating means, preparing video correcting signals for three primary color components based on the first and second corrective data calculated by the first and second operating means and modulating original video signals with the prepared video correcting signals.

In accordance with the present invention, a method for correcting color unevenness in a projected image displaying apparatus for forming images by projecting on a screen three kinds of lights corresponding to the primary color components of video signals, includes the steps of:
   measuring chromaticity at arbitrary coordinate points on the screen (first step);
   calculating first corrective data on each of the primary color components uniquely from the chromaticity at the coordinate points measured in the first step (second step);
   storing the first corrective data into memory means in association with the coordinates of the points at which chromaticity has been measured (third step);
   reading out the first corrective data in association with a plurality of coordinate points from the memory means and calculating, based on the read-out first corrective data, second corrective data used for correctively modulating video signals to be applied to display elements emitting three primary color components in order to form picture elements at which no measurement of chromaticity was made (fourth step); and
   preparing video correcting signals for three primary color components based on the first and second corrective data calculated in the second and fourth steps and modulating original video signals by the prepared video correcting signals (fifth step).

In accordance with another aspect of the present invention, a projected image displaying apparatus further includes:
   voltage varying means capable of separately changing the amplitude voltages and bias voltages of video signals outputted to the display elements;
   controlling means outputting control information for controlling the voltage varying means; and
   memory means storing the control information outputted from the controlling means.

Further aspect of the present invention lies in that a projected image displaying apparatus, includes:
   a projected image displaying unit comprising:
      voltage varying means capable of separately changing the amplitude voltages and bias voltages of video signals outputted to display elements;
      first controlling means outputting first control information for controlling the voltage varying means; and
      memory means storing the first control information outputted from the first controlling means, and
   a chromaticity adjusting system comprising:
      chromaticity measuring means for measuring chromaticity of light output emitted by the projected image displaying unit; and
      second controlling means outputting second controlling signals instructing the first controlling means to output first control information for controlling the voltage varying means, based on the measurement of chromaticity outputted from the chromaticity measuring means.

In the thus constructed projected image displaying apparatus in accordance with the present invention, the first operating means calculates corrective data on each of the primary color components uniquely from the chromaticity at any coordinate points on the screen measured by the chromaticity measuring means. Thereafter, the thus calculated corrective data can be stored in the memory means in association with the coordinates of the points at which chromaticity has been measured. Therefore, it is possible to read out the corrective data repeatedly for reference or utilizing it for calculative operation.

The second operating means can calculate, based on the read-out first corrective data in association with a plurality of coordinate points from the memory means, second corrective data used for correctively modulating video signals to be applied to display elements emitting three primary color components in order to form picture elements at which no measurement of chromaticity was made.

The first and second corrective data calculated by the first and second operating means are constructed so that when a projected image is reproduced on the screen based on these data, both the first and second corrective data will not cause any color irregularity or unevenness one another. Therefore, it is possible to obtain projected images free from color unevenness by allowing the correctively modulating means to prepare video correcting signals for three primary color components from the total corrective data and modulate each of original video signals corresponding to respective three primary colors based on the prepared video correcting signals.

In accordance with a method for correcting color unevenness in a projected image displaying apparatus of the present invention, the first corrective data on each of the primary color components is calculated at second step uniquely from the chromaticity at arbitrary coordinate points measured at the first step. Thereafter, at fourth step, based on the first corrective data in association with a plurality of coordinate points calculated in the second step, calculation can be executed of the second corrective data used for correctively modulating video signals to be applied to display elements emitting three primary color components in order to form picture elements at which no measurement of chromaticity was made.

The first and second corrective data calculated in the second and fourth steps are constructed so that when a projected image is reproduced on the screen based on these data, both the first and second corrective data will not cause any color irregularity or unevenness one another. Therefore, it is possible to obtain projected images free from color unevenness at fifth step by preparing video correcting signals for three primary color components from the total corrective data and then modulating each of original video signals corresponding to respective three primary colors based on the prepared video correcting signals.

Further, in the projected image displaying apparatus of the present invention, the voltage varying means is capable of separately changing the amplitude voltages and bias voltages of video signals outputted by display elements. In addition, the controlling means may output control information for controlling the voltage varying means so as to allow the display elements to change the output amplitude voltage and bias voltage following proper procedures, to thereby obtain projected images having optimal chromaticity. Moreover, by virtue of the memory means, it is possible to keep the control information as non-volatile memory that allows the reproduction of the projected images having the optimal chromaticity.

The operation of the chromaticity adjusting system in the projected image displaying apparatus of the present invention can be descried as follows.

Initially, in the projected image displaying apparatus, the voltage varying means is capable of separately changing the amplitude voltages and bias voltages of video signals outputted by display elements. In addition, the first controlling means may output first control information for controlling the voltage varying means so as to allow the display elements to change the output amplitude voltage and bias voltage following proper procedures, to thereby obtain projected images having optimal chromaticity. Moreover, by virtue of the memory means, it is possible to keep the control information as non-volatile memory that allows the reproduction of the projected images having the optimal chromaticity.

Based on the measurement by the chromaticity measuring means on the chromaticity of light output from the projected image displaying apparatus, the second control means may output second controlling information to the first controlling means so as to instruct the first controlling means to output the first controlling information for controlling the voltage varying means.

BRIEF DESCRIPTION OF THE DRAWINGS

FIG. 3AA is a waveform diagram showing a projected image signal generated by the conversion in an analog converting circuit shown in FIG. 2;

FIG. 3CC is a waveform diagram showing a projected image signal generated by the conversion in an analog converting circuit shown in FIG. 2;

FIG. 13A is a waveform diagram showing a video signal used when chromaticity adjustment for "white" is conducted in the embodiment shown in FIG. 10;

FIG. 13C is a waveform diagram showing a video signal used when chromaticity adjustment for "white" is conducted in the embodiment shown in FIG. 10;

FIG. 13F is a waveform diagram showing a video signal used when chromaticity adjustment for "white" is conducted in the embodiment shown in FIG. 10;

FIG. 13B is a waveform diagram showing a video signal used when chromaticity adjustment for "white" is conducted in the embodiment shown in FIG. 10;

FIG. 17A is a waveform diagram showing a video signal used when chromaticity adjustment for "black" is conducted in the embodiment shown in FIG. 10;

FIG. 17C is a waveform diagram showing a video signal used when chromaticity adjustment for "black" is conducted in the embodiment shown in FIG. 10;

FIG. 17F is a waveform diagram showing a video signal used when chromaticity adjustment for "black" is conducted in the embodiment shown in FIG. 10;

FIG. 17B is a waveform diagram showing a video signal used when chromaticity adjustment for "black" is conducted in the embodiment shown in FIG. 10.

DESCRIPTION OF THE PREFERRED EMBODIMENTS

Figure 5:
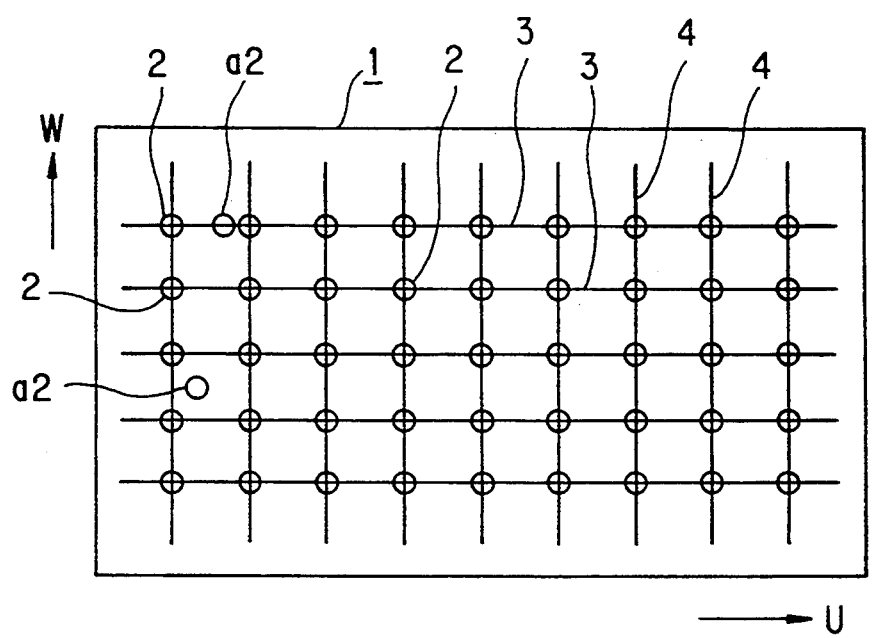
FIG. 5 is a diagram showing positions of chromaticity measuring points on a liquid crystal display screen as an embodied example of the present invention.
Figure 6:
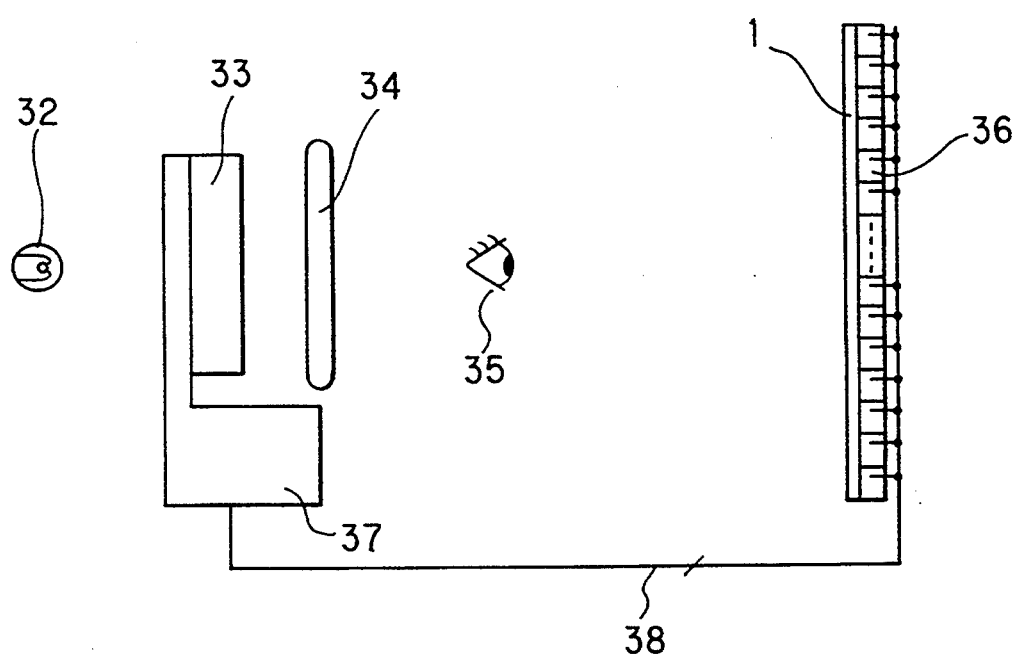
FIG. 6 is an illustrative view showing a positional relation of the optical arrangement in an embodiment of the present invention.

Initially, FIG. 5 shows an example of chromaticity measuring points on a liquid crystal display screen shown as an example of an embodiment of the present invention, and FIG. 6 is an illustrative view showing a positional relation of component used in the measurement. In this measurement, it is preferable to perform correction of dispersion of chromaticity in the liquid crystal display device under a circumstance allowing as great a transmittance of liquid crystal as possible. Therefore, the following operation of correction for chromaticity is to be made using a 'white' projected image for measuring light output in order to determine chromaticity distribution on the display image screen.

Figure 7:
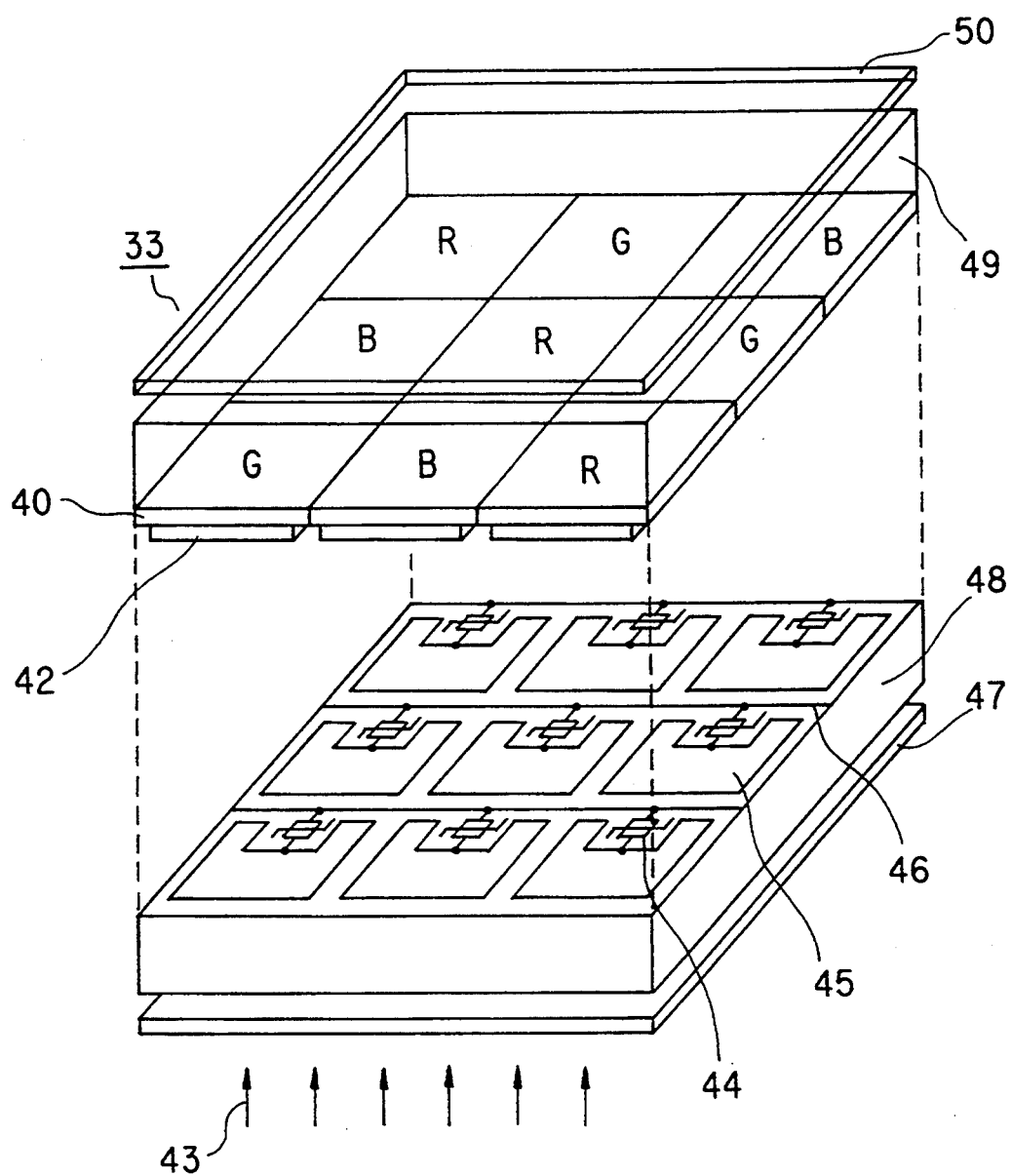
FIG. 7 is a perspective view showing the structure of a liquid crystal projected image displaying device used for the means shown in FIG. 6.

Designated at 33 in FIG. 6 is an elemental array of a liquid crystal projected image displaying apparatus in accordance with an embodiment of the present invention, and this elemental array 33 has a structure as shown in FIG. 7. The structure shown in FIG. 7 includes color filters 40, liquid crystal 42, diodes 44, pixel electrodes 45, a pair of polarizing plates 47 and 50, and a pair of glass substrate 48 and 49. Here, reference numerals 43 and 46 denote white light rays emitted from a light source 32 and a scan line, respectively. As well known, one element is disposed in an area where one pixel electrode 45 occupies, and serves to present one color of three primary colors RGB. Three RGB color light beams emitted from three different elements each presenting one of RGB colors converge on a screen 1 to be recognized as one picture element. The brightness of each of RGB colors is controlled by varying the voltage applied to each pixel electrode 45 so as to change the transmittance of liquid crystal to thereby control the intensity of light that passes through the liquid crystal.

In FIG. 6, reference numeral 34 designates an optical system composed of lenses and mirrors, etc., and serves to converge the RGB light on the screen 1. More specifically, white light emitted from the light source 32 passes through the liquid crystal projected image displaying elemental array 33, in which a number of light beam sets are formed such that each light beam set has RGB light components and is adjusted in light intensity to produce one picture element. The thus formed light beam sets containing RGB components are focalized on the screen 1 through the optical system 34 to form an image thereon. The thus formed image is observed by an user from an observing direction 35.

Unillustrated sensor portions of a chromaticity meter 36 locate at positions wherein picture elements on the screen 1 are to be measured on chromaticity. The chromaticity meter 36 measures chromaticity of the picture elements to be measured and outputs the data of the chromaticity measurement for each picture element to a liquid crystal projected image display elemental array controlling section 37 through a chromaticity data signal path 38. It should be noted that the chromaticity data signal path 38 can be formed of not only a wired means but also of a wireless means using such as infrared carrier wave signals, etc.

Referring next to FIG. 5, a light beam set composed of RGB light components having passed through the liquid crystal projected image displaying elemental array 33 is projected on the screen 1 so as to form a picture element a2 presenting a certain color specified by the video signal. A number of such picture elements a2 are arranged closely in both horizontal and vertical directions to form an image. Thus, the user recognizes composition of picture elements a2 arranged on the screen 1 as an image. In this image-forming, the liquid crystal projected image displaying elemental array 33 creating a projected image of picture elements a2 plays a major role but, it is impossible to manufacture a liquid crystal projected image displaying elemental array 33 which is completely free from variation of output light intensity in all the pixels. In other words, each pixel of the liquid crystal projected image displaying elemental array 33 inevitably differs more or less in output light intensity from the other part thereof, this variation in output light intensity causes picture elements a2 to be different in chromaticity, giving rise to color unevenness. Accordingly, controlling process of correcting color unevenness may be carried out as the following manner. First, a picture element 2 is selected equally from every micro-region composed of picture elements a2, and the thus selected picture elements 2 are measured on chromaticity. The measurement is fed back to the video signals applied to the three liquid crystal projected image display devices forming respective RGB colors. By this feed back, the video signals for producing the rest unselected picture elements a2 are corrected so that the light output may be increased or decreased, to thereby eliminate chromaticity difference among picture elements a2.

In the selection of picture elements 2 to be measured, horizontal lines 3 arranged at a certain interval and vertical lines 4 arranged at a certain interval are formed, and picture elements occupying in the intersecting points therebetween arranged as lattice points may be selected as picture elements 2 to be measured on chromaticity. The chromaticity meter 36 is constructed such that a chromaticity meter element locates at each of the thus selected picture elements 2 and measures the chromaticity. Here, a picture element 2 measured on chromaticity will be represented by coordinate point (U, W), and each measurement of chromaticity is stored in association with its coordinate point (U, W), and will be used for calculative operation.

Now, description will be made of the correcting method of the video signals applied to the three liquid crystal projected image display devices which form respective RGB colors in order to produce the rest unselected picture elements a2 based on the feed back of the measurement of chromaticity. First of all, from the chromaticity measured for each picture element 2, corrective data at the point as to each RGB color is calculated. Then, corrective data on each RGB color for a picture element a2 at which no measurement on chromaticity was made is calculated by effecting a linear interpolating approximation on the basis of corrective data on each RGB color for the nearest four grid points enclosing the picture element a2.

Next, description will be made on the calculation for determining corrective data on each of G, B and R signals at a measured picture element 2 from the chromaticity data measured at the picture element 2.

Provided, for example, that a picture element 2 designated by the coordinates (U, W) on the screen 1 presents chromaticity measurement data (x, y), corrective data $<G>$, $<B>$ and $<R>$ can be uniquely defined by the following expressions:—

$$<G> = ax + by \quad (1)$$

$$<B> = cx + dy \quad (2)$$

$$<R> = ex + fy \quad (3)$$

where a, b, c, d, e and f are constants.

Here, it should be noted that all the corrective data $<G>$, $<B>$ and $<R>$ mentioned above can also be determined by a calculating means outside the apparatus.

Figure 8:
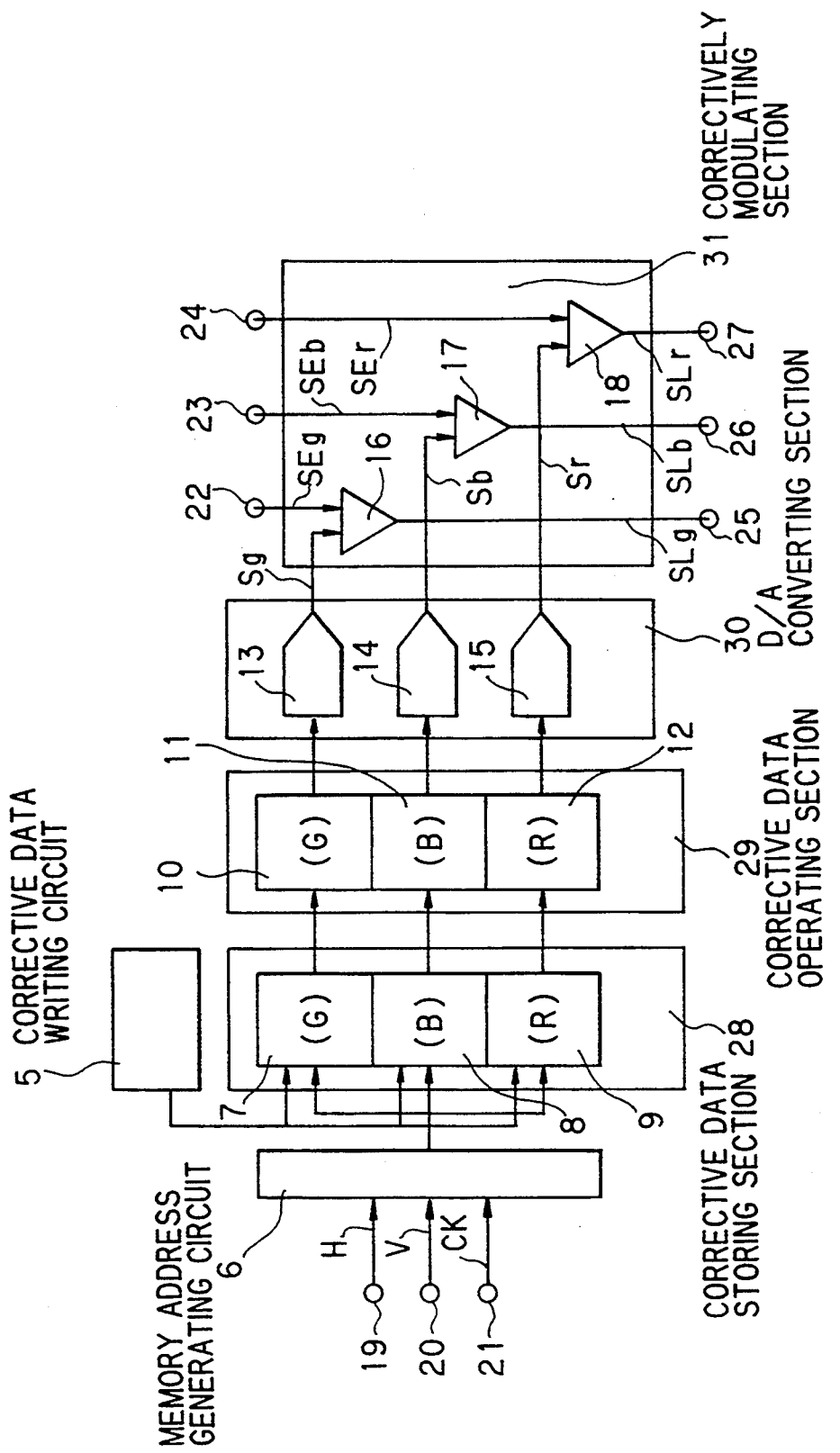
FIG. 8 is a circuit block diagram used in an embodiment of the present invention.

FIG. 8 shows a block circuit diagram used in a first embodiment of the present invention. With reference to FIG. 8, description will be made in detail on a calculation process of determining three RGB color corrective data for forming a picture element a2g shown in FIG. 9, based on the fed back corrective data $<G>$, $<B>$ and $<R>$ obtained as above. The thus determined RGB color corrective data are used to correct the three video signals respectively applied to three liquid crystal projected image display elements respectively serving to display RGB colors to be composed so as to form a picture elements a2g.

A corrective data writing circuit 5 picks up chromaticity measurement (x, y) by the chromaticity meter 36 for a picture element 2 at the coordinates (U, W) on the screen 1, and calculates corrective data $<G>$, $<B>$ and $<R>$ based on the formulae (1), (2) and (3) to store the result into respective corrective data memories 7, 8 and 9. At the same time, the corrective data writing circuit 5 generates address information AD {(U, W)} corresponding to the coordinates (U, W) of the picture element 2 on the screen, to output the address information together with the calculated corrective data $<G>$, $<B>$ and $<R>$ to the corrective data memories 7, 8 and 9.

A corrective data storing section 28 is composed of corrective data memories 7, 8 and 9, and receives addresses AD {(U.W)} from the corrective data writing circuit 5, each of which designated an address in corresponding corrective data memory 7, 8 or 9. The corrective data storing section 28 is also fed with the corrective data on each chromaticity $<G>$, $<B>$ and $<R>$ from the same corrective data writing circuit 5, and stores the chromaticity data in the above-designated addresses AD {(U.W)}.

Based on synchronizing signals H, V and clock signal CK for the video signals for display, inputted through respective terminals 19, 20 and 21, a memory address generating circuit 6 recognizes the coordinates (U, W) of a picture element a2 expected next to be reproduced as a projected image pixel.

Figure 9:
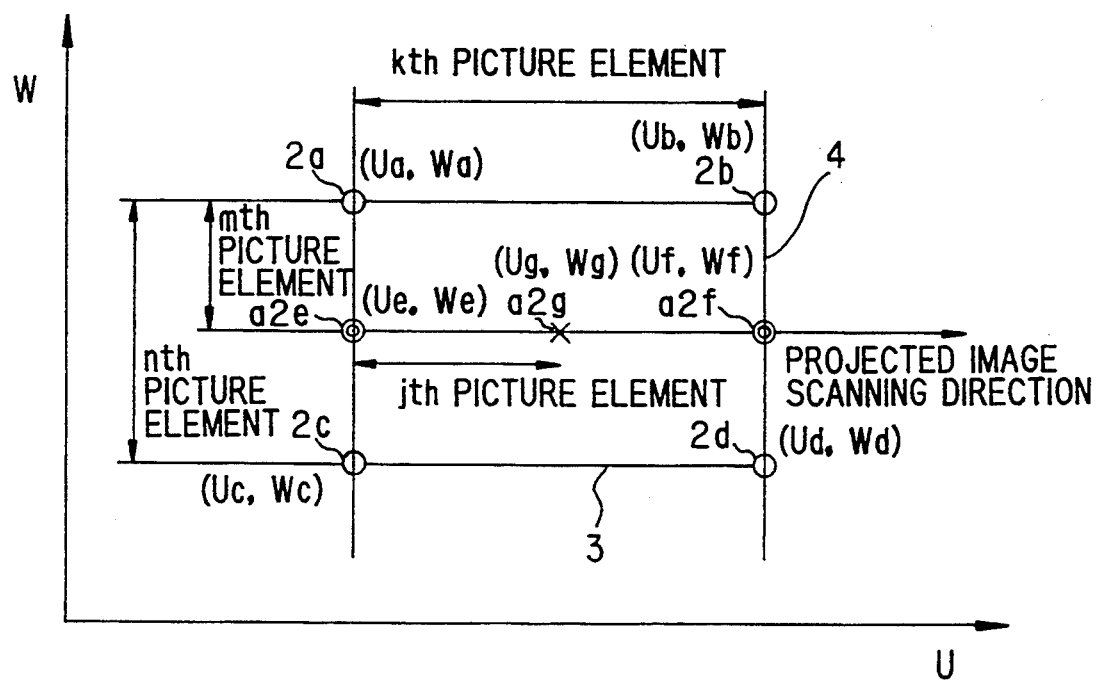
FIG. 9 is a diagram showing a positional relation on a liquid crystal display screen used in an embodiment of the present invention, and the relation between points at which chromaticity has been measured and points for which corrective data is calculated by the linear interpolation.

Now, consider, as an example, the case where the circuit 6 recognized that a picture element a2g existing at a coordinate point (Ug, Wg) shown in FIG. 9 is expected next to be reproduced. In this case, in order to produce the picture element a2g, it is necessary to determine correcting signals Sg, Sb and Sr for correctively modulating original video signals SEg, SEb and SEr to be applied to liquid crystal in respective three liquid crystal projected image display elements respectively serving to display RGB colors. In order to calculate the signals Sg, Sb and Sr, corrective data on neighboring four picture elements 2a at (Ua, Wa), 2b at (Ub, Wb), 2c at (Uc, Wc) and 2d at (Ud, Wd) enclosing a point (Ug, Wg) are required, therefore, the memory address generating circuit 6 generates addresses AD {(Ua, Wa)}, AD {(Ub, Wb)}, AD {(Uc, Wc)} and AD {(Ud, Wd)} on a corrective data storing section 28 in which corrective data $<G>$, $<B>$ and $<R>$ for the neighboring four picture elements 2a, 2b, 2c and 2d are stored. The thus generated addresses are outputted to the corrective data storing section 28. Accordingly, the following relations hold.

$$Ua = Uc \leqq Ug \leqq Ub = Ud \quad (4)$$

$$Wa = Wb \geqq Wg \geqq Wc = Wd \quad (5)$$

Correcting data interpolation processing circuits 10, 11 and 12 calculate corrective data $<G>$, $<B>$ and $<R>$ for the picture element a2g, respectively by executing linear interpolating operation using corrective data $<G>$, $<B>$ and $<R>$ for the four picture elements 2 that enclose the picture element a2g as in the following way and outputs the result to D/A converters 13, 14 and 15, respectively.

As an example, calculations in the liner-interpolating process as to corrective data on G-signals will be described. A corrective data memory 7 for corrective data on G-signals holds corrective data $<Ga>$, $<Gb>$, $<Gc>$ and $<Gd>$ for picture elements 2a at (Ua, Wa), 2b at (Ub, Wb), 2c at (Uc, Wc) and 2d at (Ud, Wd) in addresses AD {(Ua, Wa)}, AD {(Ub, Wb)}, AD {(Uc, Wc)} and AD {(Ud, Wd)}, respectively. When these addresses AD {(Ua, Wa)}, AD {(Ub, Wb)}, AD {(Uc, Wc)} and AD {(Ud, Wd)} are inputted from the memory address generating circuit 6, the memory 7 in turn sends out the corrective data $<Ga>$, $<Gb>$, $<Gc>$ and $<Gd>$ to a corrective data interpolation processing circuit for G-signals 10.

Since the relations (4) and (5) hold on the screen 1, it is possible to assume that the picture elements 2b and 2c exist at kth places rightward, respectively, from the picture elements 2a and 2c. The picture elements 2c and 2d are assumed to exist at nth places downward, respectively, from the picture elements 2a and 2b. Further, corrective data on G-signal at each point in FIG. 9 will be assumed as follows:—

$<Ge>$: corrective data on G-signal at a picture element a2e designated by the coordinates (Ue, We) existing at mth place downward from the picture element a2a;

<Gf>: corrective data on G-signal at a picture element a2f designated by the coordinates (Uf, Wf) existing at mth place downward from the picture element 2b; and <Gg>: corrective data on G-signal at the picture element a2g designated by the coordinates (Ug, Wg) existing at jth place rightward from the picture element a2e.

In this assumption, <Ge>, <Gf> and <Gg> are given as the following expressions:—

$$<Ge> = \{(<Ga> - <Gc>)/n\} \times m + <Ga> \quad (6)$$

$$<Gf> = \{(<Gb> - <Gd>)/n\} \times m + <Gd> \quad (7)$$

$$<Gg> = \{(<Gf> - <Ge>)/k\} \times j + <Ge> \quad (8)$$

Here, the following relations hold:—

$Ua=Uc=Ue, Ub=Ud=Uf;$ $Ua+j=Ug, Ua+k=Ub;$ $Wa=Wb, Wc=Wd, We=Wf=Wg;$ and $Wa=Wc+n=We+m.$ The corrective data interpolation processing circuit for G-signals 10, based on the formulae (6), (7) and (8) calculates corrective data <Ge>, <Gf> and <Gg> for G-signals for correcting chromaticity values of the picture elements a2e, a2f and a2g present, respectively, at points (Ue, We), (Uf, Wf) and (Ug, Wg), to output the result to the D/A converter 13. For the picture elements 2 at which the measurement of chromaticity has been effected, there is no need for calculating corrective data <G> by the linear interpolation. Therefore, the corrective data stored in the corrective data storing section 28 can be used as it is.

Correcting data <B> and <R> for B-signals and R-signals can be calculated using the same linear interpolating process.

A D/A converting section 30 is composed of D/A converters 13, 14 and 15, which receive corrective data <G>, <B> and <R> at the picture elements 2 and a2 as digital data, convert them into correcting signals Sg, Sb and Sr having analog values, send the result to amplifiers 16, 17 and 18, respectively.

In a correctively modulating section 31, the amplifier 16 receives an original video signal SEg to be applied to the liquid crystal projected image display device for displaying G-color through a terminal 22. In the same manner, the amplifier 17 receives an original video signal SEb to be applied to the liquid crystal projected image display device for displaying B-color through a terminal 23, and the amplifier 18 receives an original video signal SEr to be applied to the liquid crystal projected image display device for displaying R-color through a terminal 24. These signals are correctively modulated in amplitude through amplification in accordance with correcting signals Sg, Sb and Sr supplied from the D/A converting section 30, and the resultant video signals SLg, SLb and SLr are outputted from terminals 25, 26 and 27 to be applied to respective liquid crystal elements of the liquid crystal projected display devices forming GBR colors.

As described heretofore, chromaticity of picture elements for reproducing the projected image is successively corrected, so that dispersion of chromaticity over the entire image may be eliminated.

Figure 1:
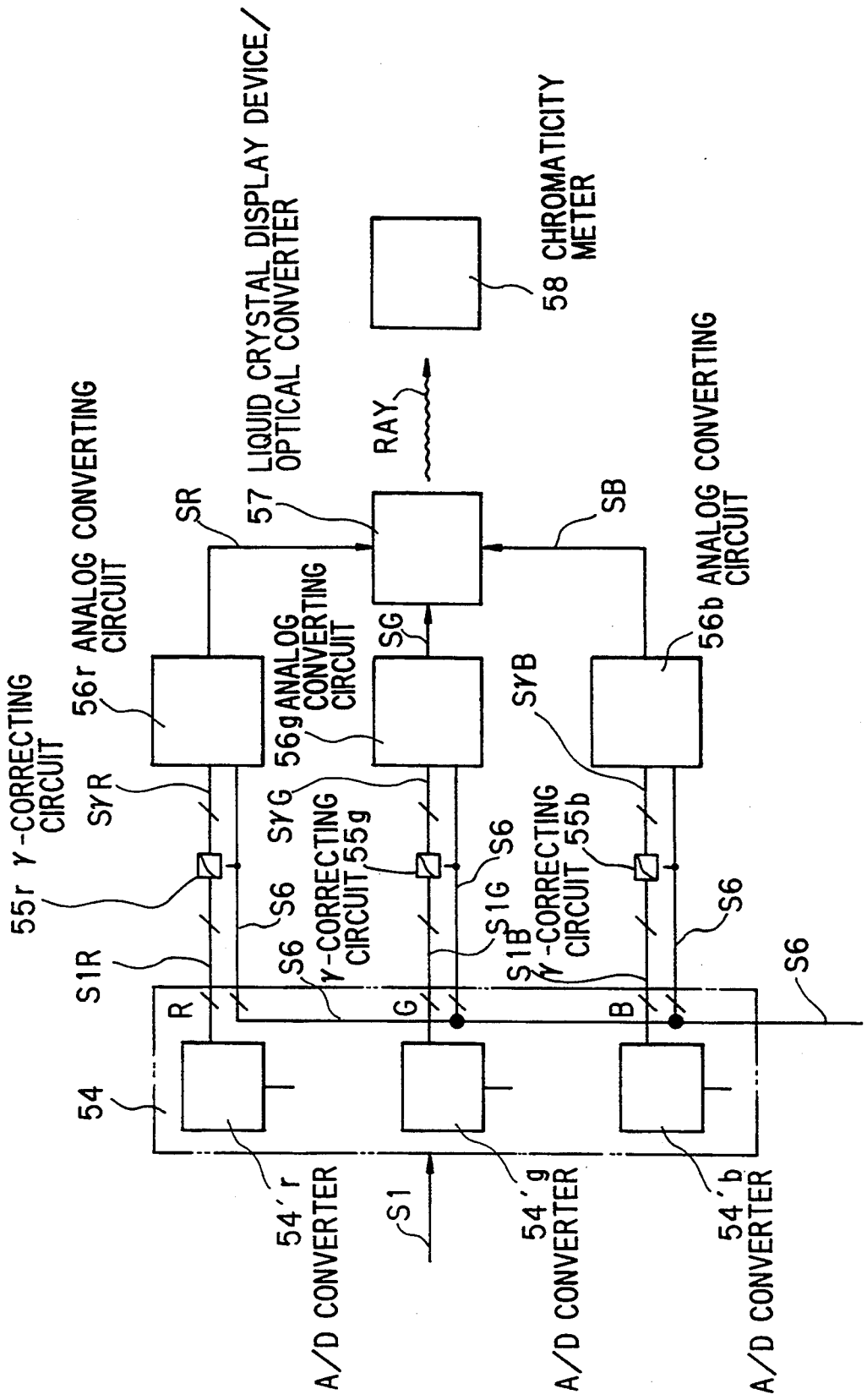
FIG. 1 is a block diagram showing a circuit for generating video signals provided for a conventional liquid crystal display device.
Figure 2:
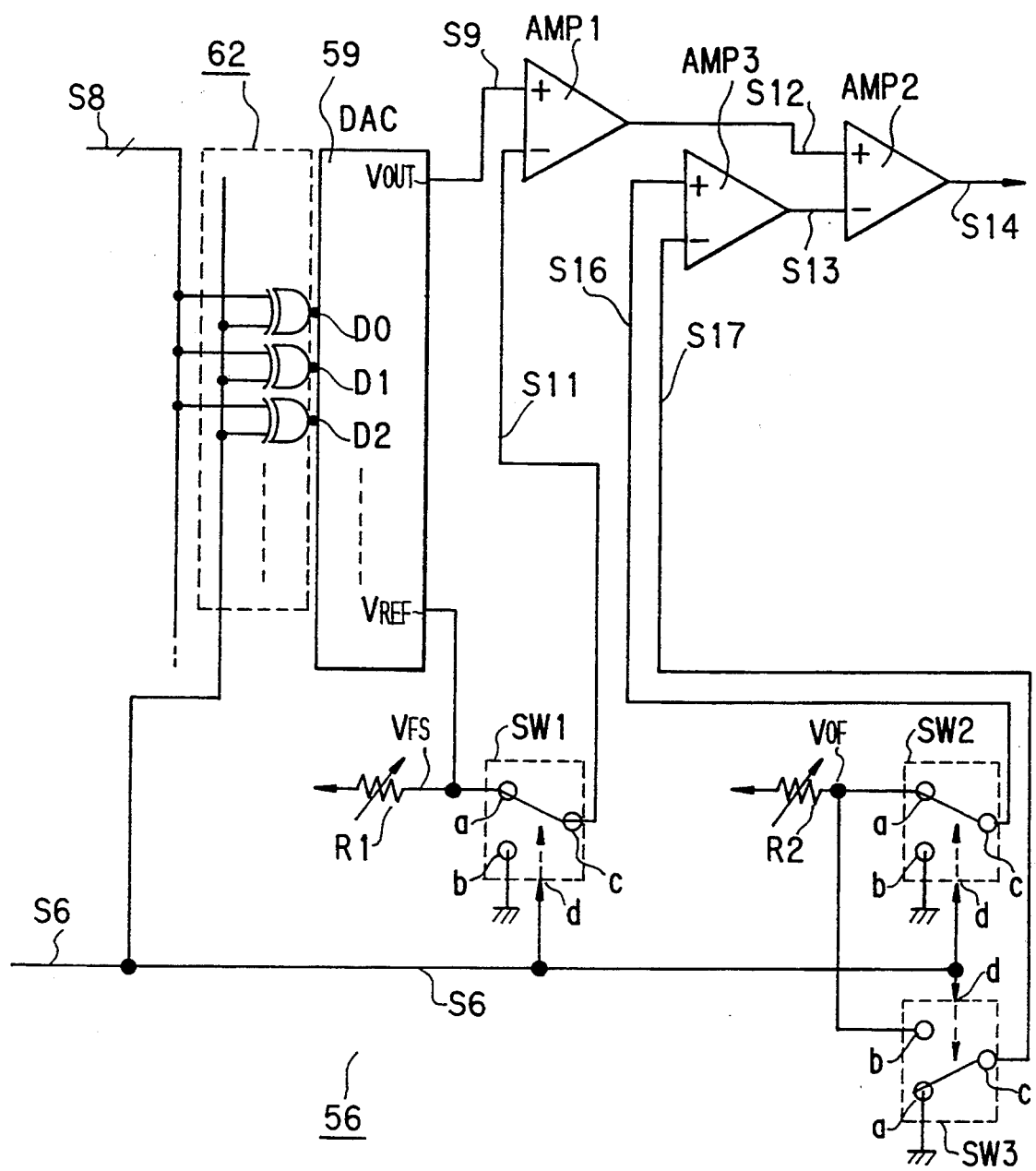
FIG. 2 is a circuit diagram showing an analog converting circuit shown in FIG. 1.
Figure 3A:
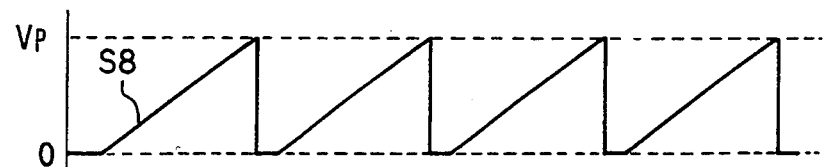
FIG. 3A is a waveform diagram showing a projected image signal generated by the conversion in an analog converting circuit shown in FIG. 2.
Figure 3B:
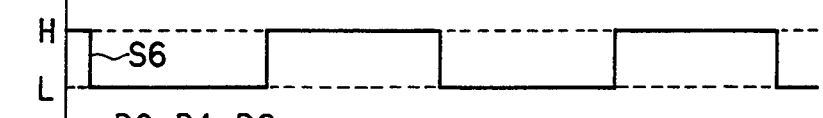
FIG. 3B is a waveform diagram showing a projected image signal generated by the conversion in an analog converting circuit shown in FIG. 2.
Figure 3A:
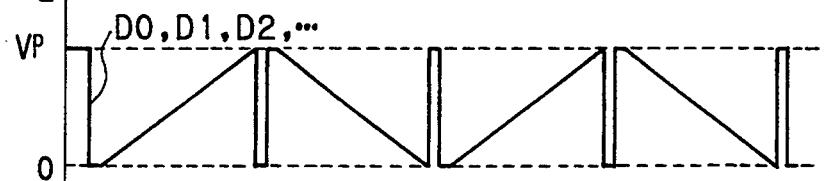
Figure 3C:
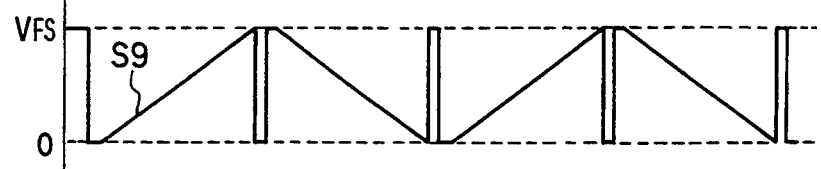
FIG. 3C is a waveform diagram showing a projected image signal generated by the conversion in an analog converting circuit shown in FIG. 2.
Figure 3D:
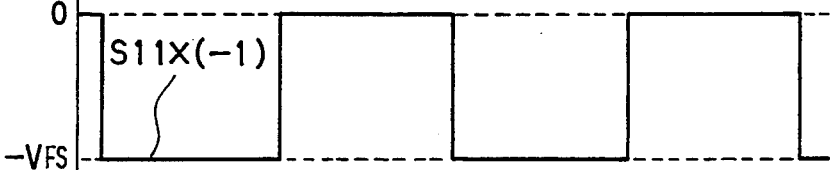
FIG. 3D is a waveform diagram showing a projected image signal generated by the conversion in an analog converting circuit shown in FIG. 2.
Figure 3C:
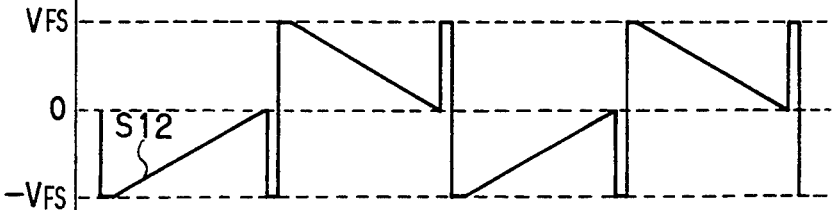
Figure 3E:
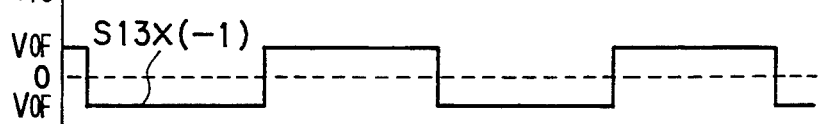
FIG. 3E is a waveform diagram showing a projected image signal generated by the conversion in an analog converting circuit shown in FIG. 2.
Figure 3F:
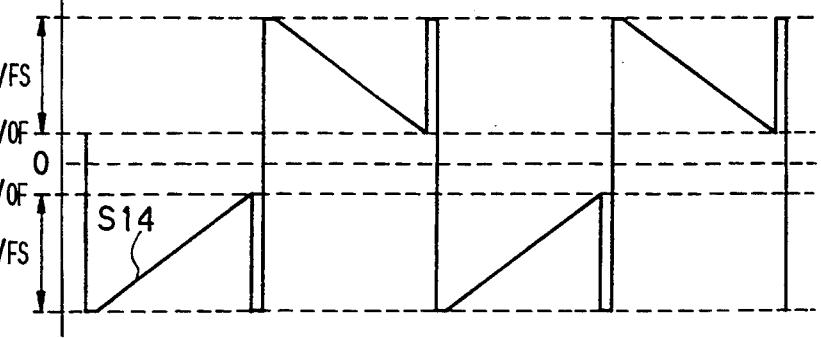
FIG. 3F is a waveform diagram showing a projected image signal generated by the conversion in an analog converting circuit shown in FIG. 2.
Figure 10:
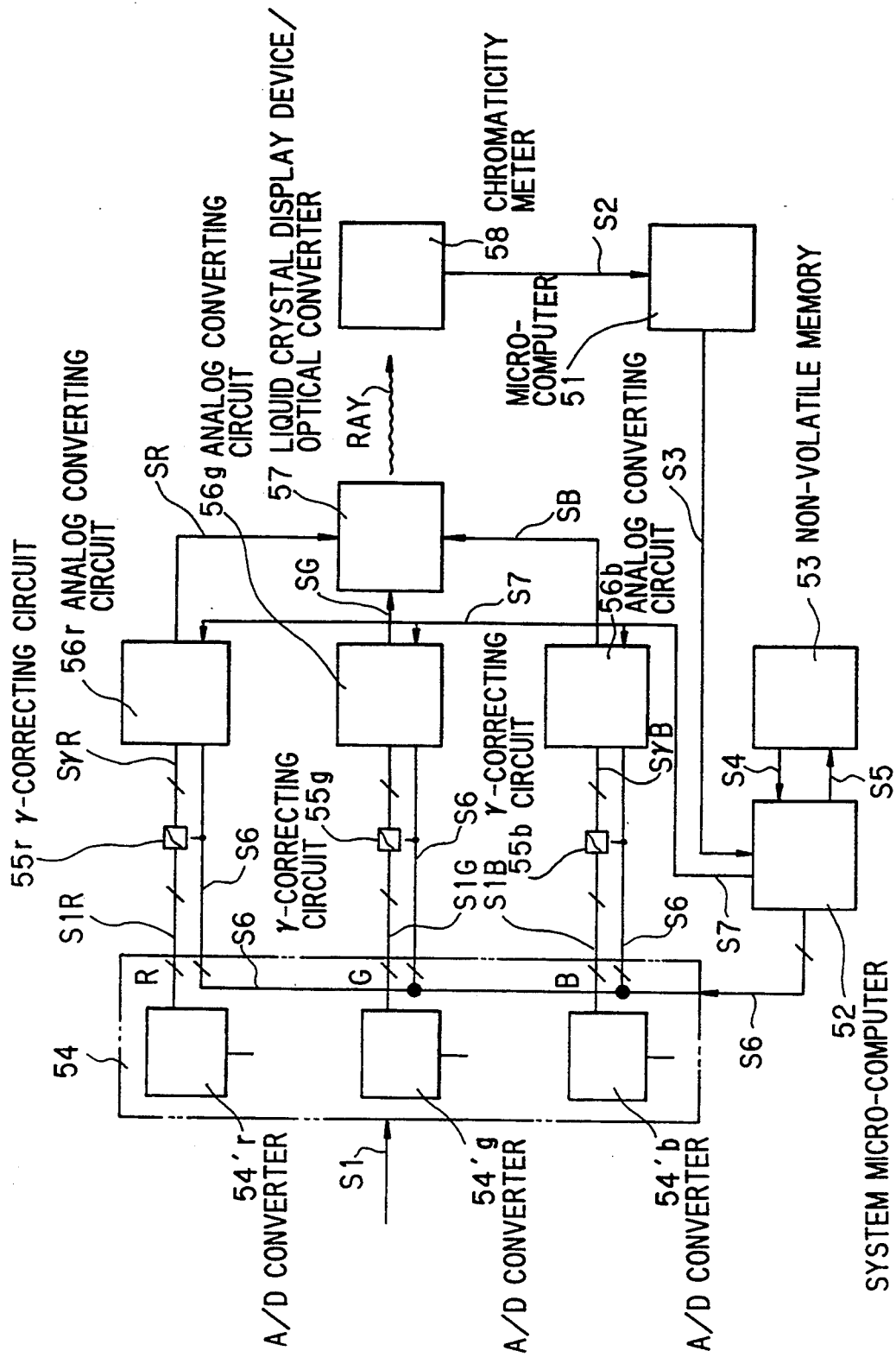
FIG. 10 is circuit block diagram showing for organizing another embodiment of the present invention.

FIG. 10 shows a block circuit diagram for embodying another embodiment of the present invention. In this figure, γ-correction circuits 55r, 55g and 55b are all identical (therefore, will be generally referred to as "γ-correction circuit 55), and analog circuits 56r, 56g and 56b are all composed of an identical analog converting circuit 56 shown in FIG. 11. With regard to the flow of the video signals, the same flow of signals as described in FIGS. 1 and 2 will be allotted with identical reference numerals, and the description thereof will be omitted.

Figure 12A:
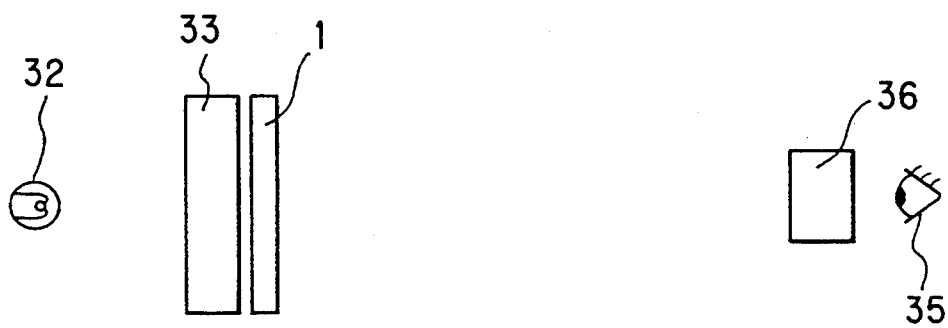
FIG. 12A is an illustrative view showing one relation of optical arrangement in the embodiment shown in FIG. 10.
Figure 12B:
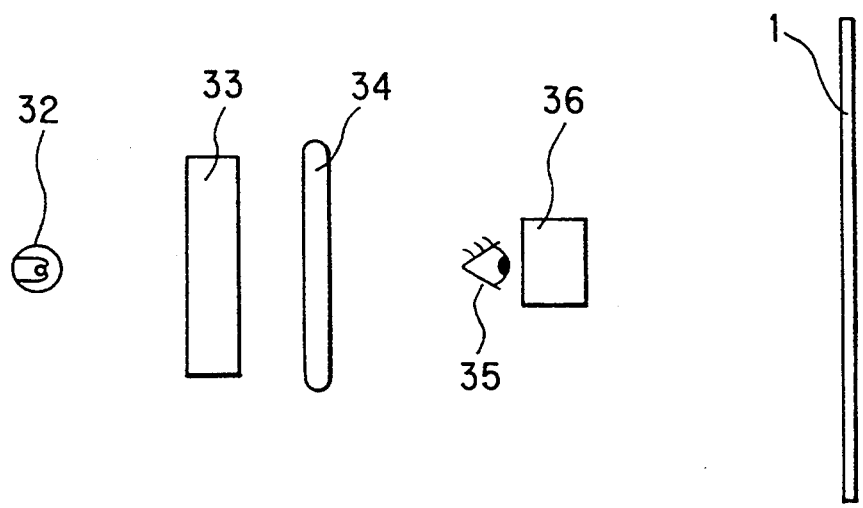
FIG. 12B is an illustrative view showing another relation of optical arrangement in the embodiment shown in FIG. 10.

FIGS. 12A and 12B show relations of optical arrangement of elements employed in the embodiment. Since each of the elements has the same function as in FIG. 6, the description will be omitted by allotting the same reference numerals. As shown in the figures, there can be considered two kinds of optical arrangements. A case shown in FIG. 12A is arranged such that the image having passed through the transparent screen 1 is sensed by the chromaticity meter 36 or the user from an observing position 35. Another case shown in FIG. 12B is arranged such that the image formed on the screen 1 by means of the optical system 34 is sensed by the chromaticity meter 36 or the user from an observing position 35.

Figure 4A:
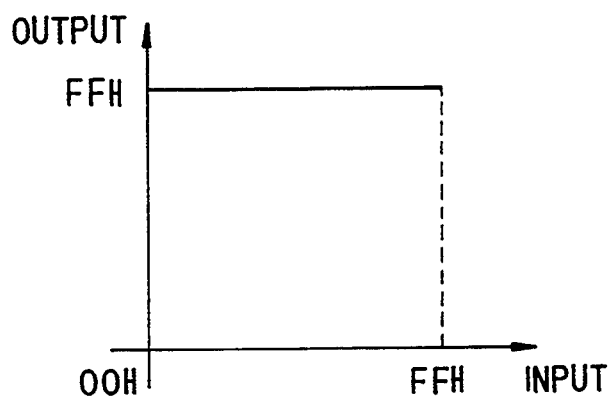
FIG. 4A is a chart showing a relation between input and output in a logical circuit.
Figure 11:
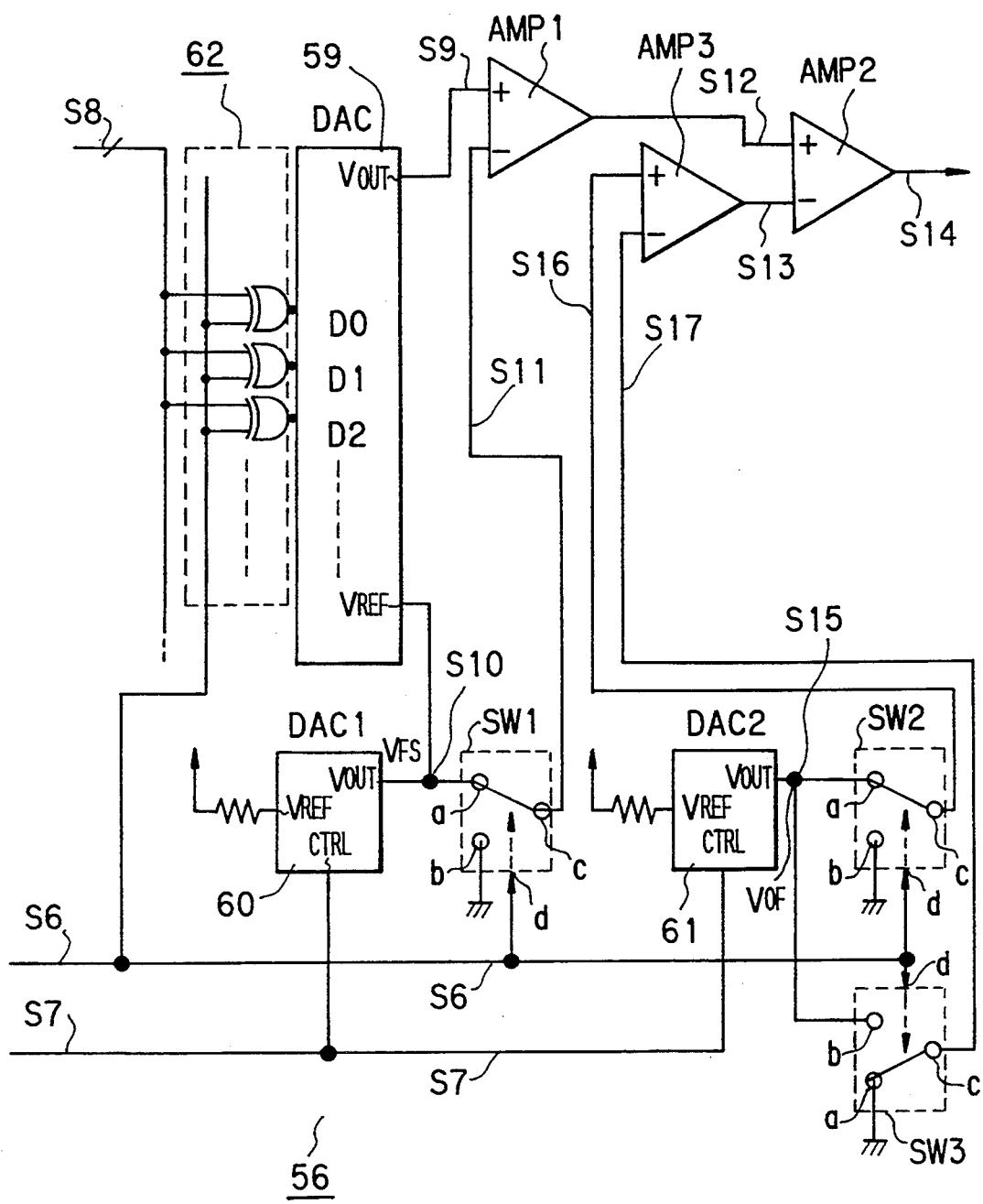
FIG. 11 is a circuitry diagram of an analog converting circuit for used in the circuit shown in FIG. 10.

Referring to FIGS. 10 and 11, description of the procedures for adjusting chromaticity for white will be made. Waveforms of video signals appearing herein are shown in FIGS. 13A, 13B, 13C and 13F. Input signal S8 in the logical circuit 62 and output digital video signal data D0, D1, D2, . . . are graphed in FIGS. 4A to 4C. A micro-computer 51 outputs a control signal S3 to a system micro-computer 52, which, in turn, based on the control signal S3 received from the micro-computer 51, outputs a signal S6 represented by a waveform shown in FIG. 13B to the logical circuit 62, switches SW1, SW2 and SW3.

A γ-correction converting table (not shown) on the γ-correcting circuit 55 is composed of random access memories (to be referred to 'RAM' hereinafter) so as to facilitate the system micro-computer 52 to rewrite the table. This table allows the digital video signal data D0, D1, D2, . . . to be set up to indicate a waveform having a constant data value FFH shown in FIG. 13A, regardless of the magnitude of the digital video signal S8 inputted as shown in the graph in FIG. 4A. This structure eliminates the necessity of providing a particular, separate signal generator. Of course, equivalent structures may be allowed by providing other means, for example, by using a signal generator capable of controlling the system.

Here, a D/A converter 60 varies the full-scale voltage VFS on the basis of a bias voltage inputted through an input terminal VREF as a reference voltage, and outputs a signal S10 having the full-scale voltage VFS as a level thereof in accordance with the instruction of a control signal S7 inputted at input terminal CTRL from the system microcomputer 52. The thus formed output signal S10 is sent to a terminal 'a' of a switch SW1. In the similar manner, a D/A converter 61 varies the offset voltage VOF on the basis of a bias voltage inputted through an input terminal VREF as a reference voltage, and outputs a signal S15 having the offset voltage VOF as a level thereof in accordance with the instruction of the control signal S7 inputted at an input terminal CTRL from the system micro-computer 52. The output signal S15 is sent to terminal 'a' of a switch SW2 and terminal 'b' of a switch SW3.

In this while, the D/A converter 59 which receives the digital video signal S8 and the control signal S6 as well as accepts the signal S10 having a waveform kept always at the full-scale voltage VFS via an input terminal VREF for reference voltage, outputs a video signal S9 having a waveform shown in FIG. 13C that is composed of the sum of waveforms shown in FIG. 13A and FIG. 13B toward a (+)terminal of an amplifier AMP 1. Accordingly, the analog converter 56 will output an video signal S14 having a waveform shown in FIG. 13F or a pulsing waveform having amplitude equal to the offset voltage VOF with a reference voltage of OV, regardless of the full-scale voltage VFS.

In controlling the offset voltage VOF, which determines the amplitude of the video signal S14, the system micro-computer 52, receiving the control signal S3 outputted from the micro-computer 51 and based on this signal, outputs the control signal S7 to a CTRL terminal of the D/A converter 61 present in each analog converters 56 so as to vary the magnitude of the offset voltage VOFoutputted from a VOUT of the D/A converter 61. Meanwhile, as the control signal S7 is also supplied to a CTRL terminal of the D/A converter 60, the system must be designed so as to vary only the output offset voltage VOFfrom the D/A converter 61 without varying the full-scale voltage V5 outputted from the VOUT terminal of the D/A converter 60. Such controlling method is disclosed, for example, in IEEE-STD-488.

Figure 14:
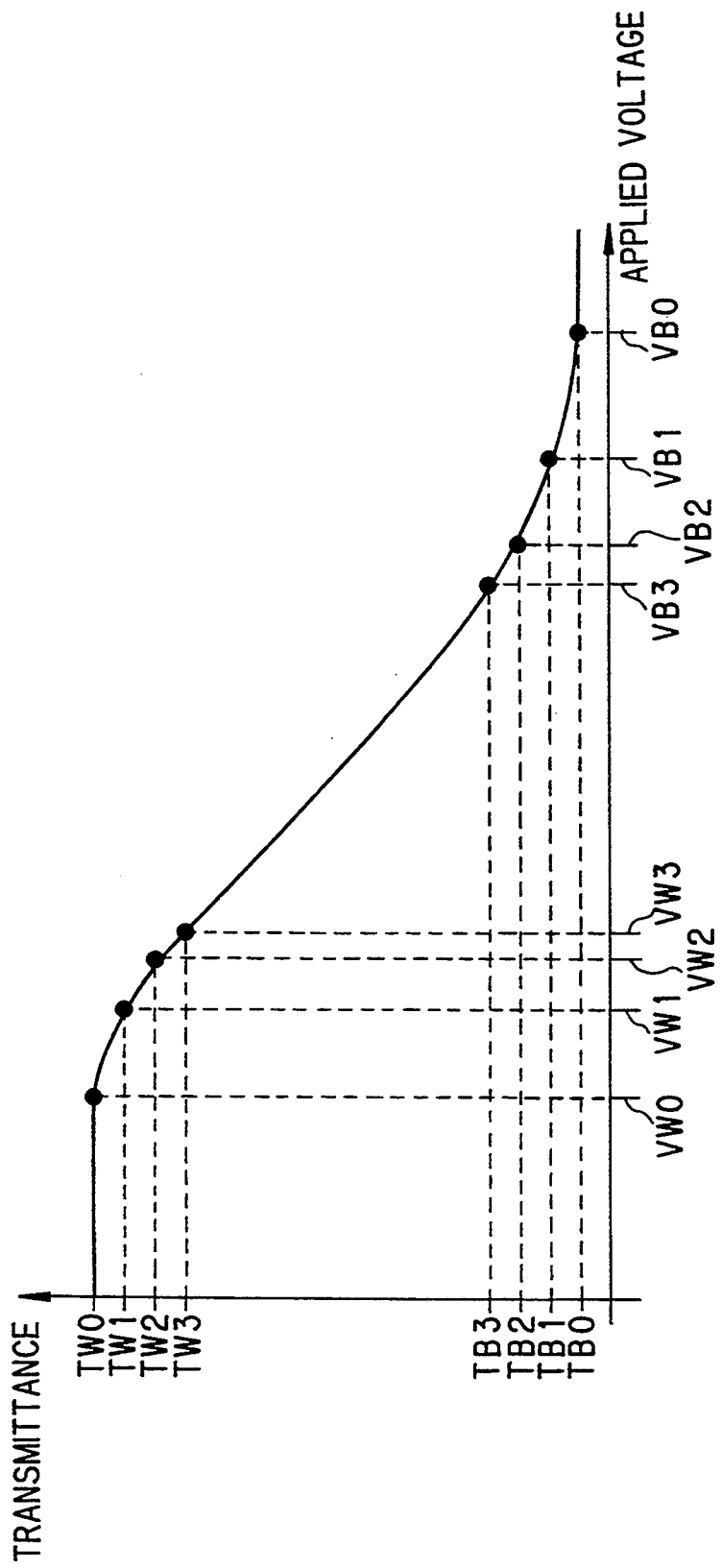
FIG. 14 is a chart showing an applied voltage-transmittance characteristic curve in a liquid crystal display device.

FIG. 14 is a plot showing a relation between applied voltage to liquid crystal and transmittance thereof for adjusting chromaticity of white. In the figure, the axis of abscissa represents applied voltage and the axis of ordinate represents transmittance of liquid crystal. Specifically, when the applied voltages are at VW0, VW1, VW2, VW3, VB3, VB2, VB1 and VB0, the transmittance will become TW0, TW1, TW2, TW3, TB3, TB2, TB1 and TB0, respectively.

As the offset voltage VOF which is equal to the amplitude of the video signal S14 applied to the liquid crystal is controlled to be as low as VW3 by operating the analog converting circuit 56, the transmittance of the liquid crystal becomes enough high to present increased light output RAY from the liquid crystal display device/optical converting section 57. In contrast, as understood from FIG. 14, when the applied voltage takes a value around VW3, the transmittance varies considerably largely with variation of the applied voltage, so that gradation is hard to produce, and therefore, error arising in quantization of transmittance of liquid crystal tends to become large as the transmittance is adjusted by the γ-correction.

On the other hand, if a little bit higher voltage is applied so that the offset voltage VOF may be equal to VW0, as understood from FIG. 14, variation in transmittance with the change of applied voltage is small in the vicinity of the voltage VW0, so that gradation is easy to produce, but the light output RAY by the liquid crystal display device/optical converting section 57 is too small, resulting in poor contrast.

The adjustment to an optimal voltage which allows easiness of producing gradation and proper brightness and contrast has been carried out empirically, but this embodiment leaves the adjustment to the micro-computer 51. More specifically, the micro-computer 51 outputs the control signal S3 for controlling procedures for producing gradation, and based on the control signal S3 the system micro-computer 52 outputs control signals S7 to the analog converting circuit 56. The analog converting circuit 56, based on the control signal S7, varies the video signal S14 representing the applied voltage to the liquid crystal within a range of from VW1 to VW3 so that the transmittance of the liquid crystal may be optimal between TW1 and TW3. The thus selected optimal value is outputted. This control is effected in the same manner for each of three RGB colors, independently, so as to select a condition wherein all the three colors present the best contrast and gradation.

Figures 15, 16A, 16B:
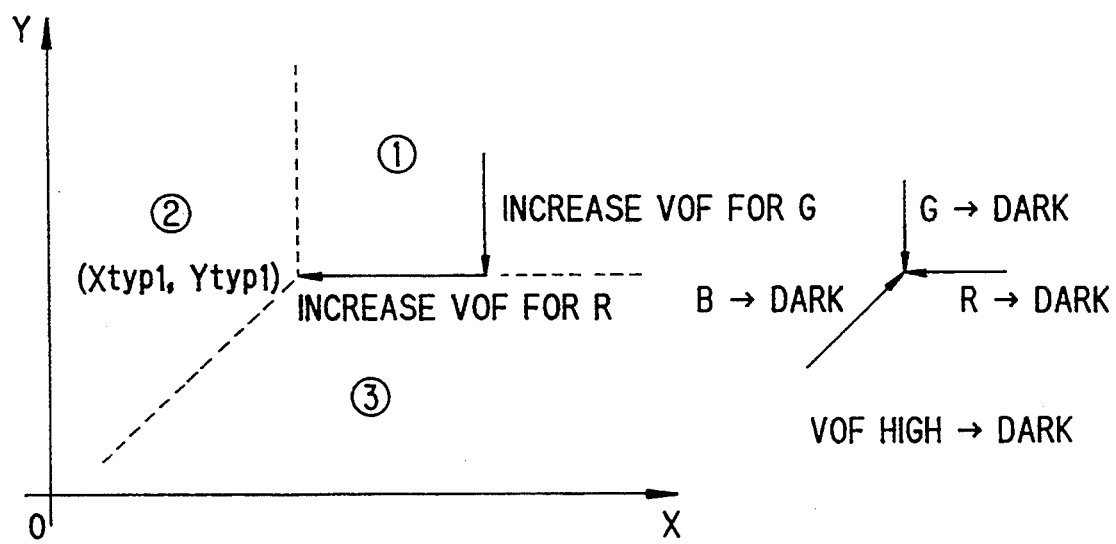
FIG. 15 is a descriptive view of controlling procedures shown on the chromaticity chart when chromaticity adjustment for "white" is conducted in the embodiment shown in FIG. 10.
FIG. 16A is a table showing controlling procedures to be preset and corresponding colors to be controlled for respective regions on the chromaticity chart when the chromaticity for "white" is to be adjusted in the embodiment shown in FIG. 10.
FIG. 16B is a table showing controlling procedures to be preset and corresponding colors to be controlled for respective regions on the chromaticity chart when the chromaticity for "black" is to be adjusted in the embodiment shown in FIG. 10.

FIG. 15 is a chromaticity chart. With reference to the figure, procedures to effect chromaticity adjustment will be explained. First of all a target chromaticity point defining "white" is assumed to be designated by the coordinates (Xtyp1, Ytyp1) on the chromaticity chart. A chromaticity meter 58 measures the chromaticity of unadjusted light output RAY and outputs the measurement as a data signal S2 to the micro-computer 51. The thus obtained chromaticity will be assumed to be designated by (X, Y) on the chromaticity chart. This point (X, Y) must belong to any one of regions 1), 2) and 3). In order to deal with any possible chromaticity measured, a series of processing procedures is to have been determined in advance for each region, and the software for controlling the operation is to have been programmed in the micro-computer 51.

If the measured chromaticity point (X, Y) lies in the region 1), this status is recognized by the micro-computer 51 as the following expression:—

$$X \geq Xtyp1, \text{ and } Y \geq Ytyp1 \qquad (9)$$

If the measured chromaticity point (X, Y) lies in the region 2), this status is recognized by the micro-computer 51 as the following expression:—

$$X < Xtyp1, \text{ and } Y \geq X \qquad (10)$$

Alternatively, if the measured chromaticity point (X, Y) lies in the region 3), this status is recognized by the micro-computer 51 as the following expression:—

$$X > Y, \text{ and } Y < Ytyp1 \qquad (11)$$

FIG. 16A is a table showing controlling procedures to be preset and corresponding colors to be controlled for respective regions on the chromaticity chart when the chromaticity for "white" is to be adjusted.

As an example, if a point (X, Y) satisfying the condition (9) is recognized by the micro-computer 51, the step 1 in the row for the region 1) in FIG. 16A teaches to perform adjustment of G-color. Therefore, in order to bring Y ($\geq$Ytyp1) close to Ytyp1, G-component in light output RAY must be reduced, or the applied voltage to the liquid crystal is to be taken large so as to increase the amplitude of the video signal S14. To achieve this, the micro-computer 51 sends for the system micro-computer 52 a signal S3 so as to increase the offset voltage VOF in the analog converting circuit 56g for G-component to thereby increase the amplitude just mentioned. The system micro-computer 52, having received the signal S3, sends out for the analog converting circuit 56g the signal S7 to thereby increase the offset voltage VOF to be outputted as an output voltage VOUT of the D/A converter 61 simultaneously.

By the control operation described above, as G-component of the light output RAY becomes small, the chromaticity meter 58 detects that the Y-coordinate of the chromaticity reduces. The micro-computer 51 recognizes this information through the output signal S2. The above series of procedures will be repeated until Y-value of the chromaticity measurement agrees with Ytyp1 of the point (Xtyp1, Ytyp1) defined as "white".

Next, referring again to FIG. 16A, the step 2 in the row for the region 1) specifies to execute adjustment of R-color. Therefore, in order to bring X ($\geq$Xtyp1) close to Xtyp1, R-component in the light output RAY must be reduced, or the applied voltage to liquid crystal is to be taken large. To achieve this, the micro-computer 51 sends for the system micro-computer 52 the signal S3 so as to increase the offset voltage VOF in the analog converting circuit 56r for R-component. Then, the same control sequence as executed above for G-component of the light output RAY is to be made, and the series of procedures will be repeated until X-value of the chromaticity measurement agrees with Xtyp1 of the point (Xtyp1, Ytyp1) defined as "white".

If the intermediately modified point reaches other chromaticity region in the way of the controlling operation, the control will be made following the procedures previously set up for the region.

Referring to FIGS. 10 and 11, description of the procedures for adjusting chromaticity for black will be made. Waveforms of video signals appearing herein are shown in FIGS. 17A, 17B, 17C and 17F. The system micro-computer 52, based on the control signal S3 received from the micro-computer 51, outputs a signal S6 represented by a waveform shown in FIG. 17B to the logical circuit 62, switches SW1, SW2 and SW3.

Figure 4B:
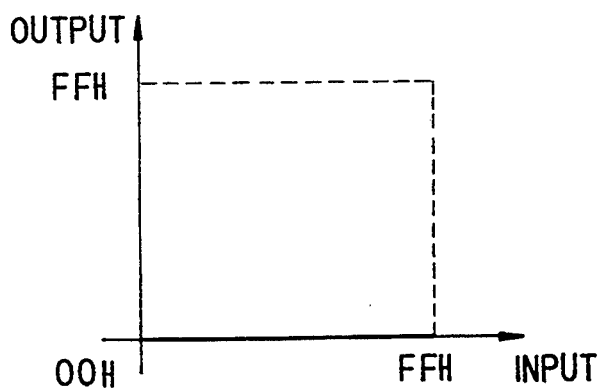
FIG. 4B is a chart showing a relation between input and output in a logical circuit.
Figure 4C:
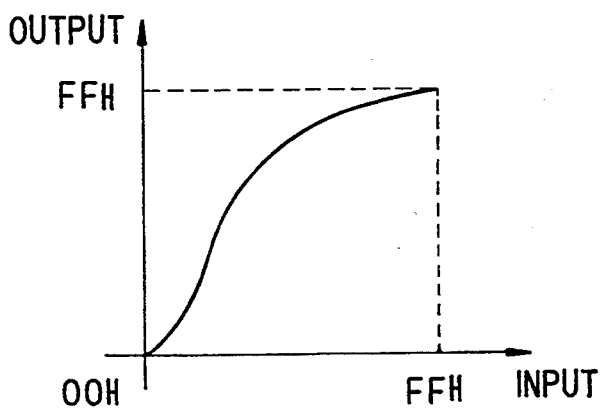
FIG. 4C is a chart showing a relation between input and output in a logical circuit.

The $\gamma$-correction converting table on the $\gamma$-correcting circuit 55 composed of RAM's allows the digital video signal data D0, D1, D2, . . . to be set up to indicate a waveform having a constant data value OOH shown in FIG. 17B, regardless of the magnitude of the digital video signal S8 inputted as shown in the graph in FIG. 4B.

The D/A converter 59 which receives the digital video signal S8 and the control signal S6 as well as accepts the signal S10 having a waveform kept always at the full-scale voltage VFS via an input terminal VREF for reference voltage, outputs a video signal S9 having a waveform shown in FIG. 17C that is composed of the sum of waveforms shown in FIG. 17A and FIG. 17B toward the (+)terminal of the amplifier AMP 1. Accordingly, the video signal S14 which the analog converter 56 outputs has a waveform shown in FIG. 17F or a pulsing waveform having amplitude equal to the sum of the offset voltage VOF and the full-scale voltage VFS with a reference voltage of OV. Since the offset voltage VOF has been already determined when the chromaticity for white was adjusted, it cannot be varied. Therefore, the amplitude of the video signal S14, or the sum of VOF, which is designated a bias voltage, and VFS depends on the full-scale voltage VFS.

In controlling the full-scale voltage VFS, the system micro-computer 52, receiving the control signal S3 outputted from the micro-computer 51 and based on this signal, outputs the control signal S7 to the CTRL terminal of the D/A converter 60 present in each analog converters 56 so as to vary the magnitude of the full-scale voltage VFS outputted from a VOUT of the D/A converter 60. Meanwhile, as the control signal S7 is also supplied to the CTRL terminal of the D/A converter 61, the system is designed so as to vary only the output full-scale voltage VFS from the D/A converter 60 without varying the offset voltage VOF outputted from the VOUT terminal of the D/A converter 61.

Subsequently, chromaticity adjustment to black will be described with reference to FIG. 14 which graphs the relation between applied voltage to liquid crystal and transmittance thereof for adjusting chromaticity.

As the sum of the offset voltage VOF and the full-scale voltage VFS which is the amplitude of the video signal S14 to be applied to liquid crystal is controlled to be as high as VB3, the transmittance of liquid crystal becomes enough low to present reduced light output RAY from the liquid crystal display device/optical converting section 57. In contrast, as understood from FIG. 14, when the applied voltage takes a value around VB3, the transmittance varies considerably largely with variation of the applied voltage, so that gradation is hard to produce, and therefore, error arising in quantization of transmittance of liquid crystal tends to become large as the transmittance is adjusted by the $\gamma$-correction.

On the other hand, if a little bit higher voltage is applied so that the sum of the offset voltage VOF and the full-scale voltage VFS may be equal to VW0, as understood from FIG. 14, variation in transmittance with the change of applied voltage is small in the vicinity of the voltage VBO, so that gradation is easy to produce, but the light output RAY by the liquid crystal display device/optical converting section 57 is too great, resulting in poor contrast.

This adjustment also is left to the micro-computer 51. More specifically, the analog converting circuit 56, based on the control signal S7, varies the video signal S14 representing the applied voltage to the liquid crystal within a range of from VB1 to VB3 so that the transmittance of the liquid crystal may be optimal between TB1 and TB3. The thus selected optimal value is outputted. This control is effected in the same manner for each of three RGB colors, independently, so as to select a condition wherein all the three colors present the best contrast and gradation.

Figure 18:
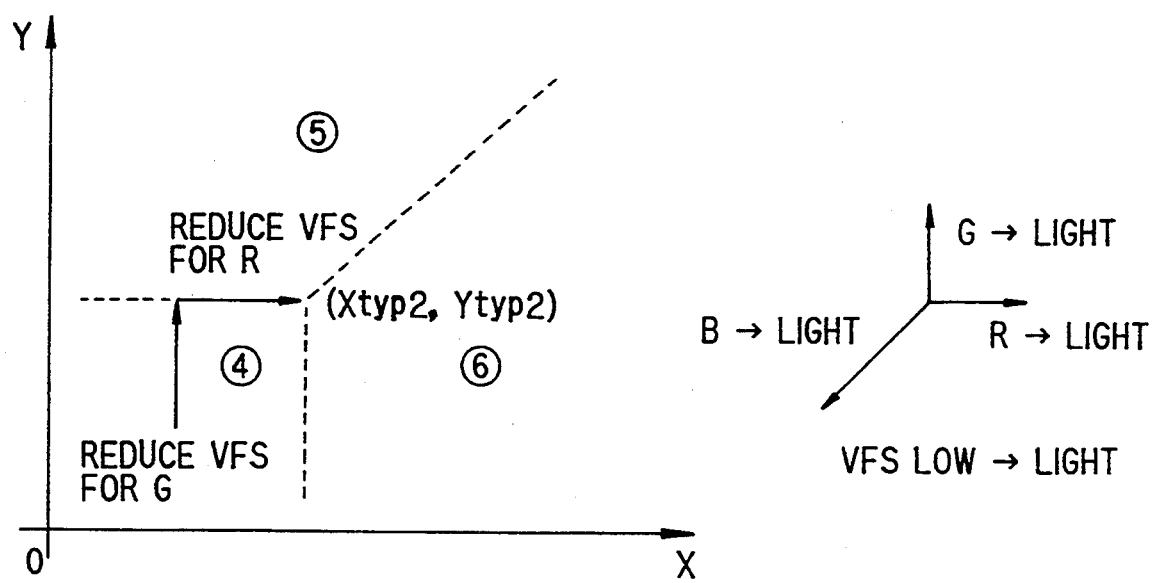
FIG. 18 is a descriptive view of controlling procedures shown on the chromaticity chart when chromaticity adjustment for "black" is conducted in the embodiment shown in FIG. 10.

Next, FIG. 18 shows a chromaticity chart. With reference to the figure, procedures to effect chromaticity adjustment will be explained. First of all a target chromaticity point defining "black" is assumed to be designated by the coordinates (Xtyp2, Ytyp2) on the chromaticity chart. The chromaticity meter 58 measures the chromaticity of unadjusted light output RAY and outputs the measurement as a data signal S2 to the micro-computer 51. The thus obtained chromaticity will be assumed to be designated by (X, Y) on the chromaticity chart. This point (X, Y) must belong to any one of regions 4), 5) and 6). In order to deal with any possible chromaticity measured, a series of processing procedures is to have been determined in advance for each region, and the software for controlling the operation is to have been programmed in the micro-computer 51.

If the measured chromaticity point (X, Y) lies in the region 4), this status is recognized by the micro-computer 51 as the following expression:—

$$X \leq Xtyp2, \text{ and } Y \leq Ytyp2 \qquad (12)$$

If the measured chromaticity point (X, Y) lies in the region 5), this status is recognized by the micro-computer 51 as the following expression:—

$$X \leq Y, \text{ and } Y \geq Y\text{typ2} \tag{13}$$

Alternatively, if the measured chromaticity point (X, Y) lies in the region 6), this status is recognized by the micro-computer 51 as the following expression:—

$$X \leq Y, \text{ and } Y \leq X\text{typ2} \tag{14}$$

FIG. 16B is a table showing controlling procedures to be preset and corresponding colors to be controlled for respective regions on the chromaticity chart when the chromaticity for "black" is to be adjusted.

As an example, if a point (X, Y) satisfying the condition (12) is recognized by the micro-computer 51, the step 1 in the row for the region 4) in FIG. 16B teaches to perform adjustment of G-color. Therefore, in order to bring Y ($\leq$Ytyp2) close to Ytyp2, G-component in light output RAY must be increased, or the applied voltage to the liquid crystal is to be made small so as to reduce the amplitude of the video signal S14. To achieve this, the micro-computer 51 sends for the system micro-computer 52 a signal S3 so as to increase the offset voltage VOF in the analog converting circuit 56g for G-component to thereby reduce the amplitude just mentioned. The system micro-computer 52, having received the signal S3, sends out for the analog converting circuit 56g the signal S7 to thereby reduce the offset voltage VOF to be outputted as an output voltage VOUT of the D/A converter 61 simultaneously.

By the control operation described above, as G-component of the light output RAY becomes large, the chromaticity meter 58 detects that the Y-coordinate of the chromaticity increases. The micro-computer 51 recognizes this information through the output signal S2. The above series of procedures will be repeated until Y-value of the chromaticity measurement agrees with Ytyp2 of the point (Xtyp2, Ytyp2) defined as "black".

Next, referring again to FIG. 16B, the step 2 in the row for the region 4) specifies to execute adjustment of R-color. Therefore, in order to bring X ($\leq$Xtyp2) close to Xtyp2, R-component in the light output RAY must be increased, or the applied voltage to liquid crystal is to be made small. To achieve this, the micro-computer 51 sends for the system micro-computer 52 the signal S3 so as to reduce the offset voltage VOF in the analog converting circuit 56r for R-component. Then, the same control sequence as executed above for G-component of the light output RAY is to be made, and the series of procedures will be repeated until X-value of the chromaticity measurement agrees with Xtyp2 of the point (Xtyp2, Ytyp2) defined as "black". In this connection, if the intermediately modified point reaches other chromaticity region in the way of the controlling operation, the control will be made following the procedures previously set up for the region.

When the control described above has been accomplished, the 51 send out for the 52 a control signal S3 which indicates that the values of control signals S7 representing respective optimum offset voltage VOF and full-scale voltage VFS for each color should be stored so as to reproduce these values at any time. The 52, in accordance with the control signal S3 inputted, outputs a data signal S5 bearing the information on the values of control signals S7 to a nonvolatile memory 53 so as to store the data therein. Hereinafter, the thus stored voltage values will be maintained without vanishing, and will be read out as required as a data signal S4 to reproduce optimal offset voltages VOF and full-scale voltages VFS.

The transmission of the control signal S3 from the 51 to 52 can be effected by not only wired means but also by wireless means such as using infrared carrier wave signals, etc.

Since a typical projecting apparatus includes a 52 as standard equipment, it is sufficient to manipulate the software as to the control of the present invention and there is need for particular parts to be built in.

Further, it is possible to omit the 51 by providing a 52 that is enough effective to discharge the functions of the 51. In this configuration, measurement by the chromaticity meter 58 on chromaticity of the light output RAY can be directly accepted by 52, so that it is possible to realize a system at low cost still working more rapidly.

Although the above description has been made of an embodiment using liquid crystal devices, this should be taken as a mere example, and the present invention can be applied to other display devices such as a CRT in place of liquid crystal devices.

In accordance with the present invention, corrective data on each of the primary colors is formulated by the linear interpolating technique so that a projected image reproduced based on the corrective data exhibits little chromaticity difference between neighboring picture elements formed by the display elements. Accordingly, when the entire corrective data is used to prepare video correcting signals having analog values for each of the primary colors and original video signals having analog values for each of the primary colors are modulated based on the obtained video correcting signals, it is possible to inhibit dispersed distribution on the display screen which would be caused by the dispersion of the display elements and therefore it is possible to obtain a projected image free from color unevenness.

Further, in accordance with the present invention, it is possible to markedly reduce the operations required for chromaticity adjustment by the operators and it is possible to assure rapid adjustment of chromaticity, regardless of the operator's skill.

Since few additional external equipments such as circuits and connections are needed, the cost hardly rises.

Since the projected image display apparatus retains the optimal chromaticity adjusted at the time of manufacture, even if a user misuses the apparatus, there is no risk that the adjusted chromaticity might become out of fix so as not to recover. Therefore, highly increased reliability of the apparatus can be established.

What is claimed is:

1. A projected image displaying apparatus for forming images by projecting on a screen three kinds of lights corresponding to the primary color components of video signals, comprising:

chromaticity measuring means for measuring chromaticity at arbitrary coordinate points on said screen;

first operating means for calculating first corrective data on each of the primary color components uniquely from the chromaticity at the coordinate points measured by said chromaticity measuring means;

memory means for storing said first corrective data in association with the coordinates of the points at which chromaticity has been measured;

second operating means reading out said first corrective data in association with a plurality of coordinate points from said memory means and calculating, based on the read-out first corrective data, second corrective data used for correctively modulating video signals to be applied to display elements emitting three primary color components in order to form picture elements at which no measurement of chromaticity was made; and correctively modulating means, preparing video correcting signals for three primary color components based on said first and second corrective data calculated by said first and second operating means and modulating original video signals with said prepared video correcting signals.

2. A method for correcting color unevenness in a projected image displaying apparatus for forming images by projecting on a screen three kinds of lights corresponding to the primary color components of video signals, comprising the following five steps of:

(first step): measuring chromaticity at arbitrary coordinate points on said screen;

(second step): calculating first corrective data on each of the primary color components uniquely from the chromaticity at the coordinate points measured in the first step;

(third step): storing said first corrective data into memory means in association with the coordinates of the points at which chromaticity has been measured;

(fourth step): reading out said first corrective data in association with a plurality of coordinate points from said memory means and calculating, based on the read-out first correctively modulating video signals to be applied to display elements emitting three primary color components in order to form picture elements at which no measurement of chromaticity was made; and (fifth step): preparing video correcting signals for three primary color components based on said first and second corrective data calculated in the second and fourth steps and modulating original video signals by said prepared video correcting signals.

3. A projected image displaying apparatus for forming images by projecting on a screen three kinds of lights corresponding to the primary color components of video signals, comprising:

chromaticity measuring means for measuring chromaticity at arbitrary coordinate points on said screen;

first operating means for calculating first corrective data on each of the primary color components uniquely from the chromaticity at the coordinate points measured by said chromaticity measuring means;

memory means for storing said first corrective data in association with the coordinates of the points at which chromaticity has been measured;

second operating means reading out said first corrective data in association with a plurality of coordinate points from said memory means and calculating, based on the read-out first corrective data, second corrective data used for correctively modulating video signals to be applied to display elements emitting three primary color components in order to form picture elements at which no measurement of chromaticity was made;

correctively modulating means, preparing video correcting signals for three primary color components based on said first and second corrective data calculated by first and second operating means and modulating original video signals with said prepared video correcting signals; and voltage varying means for changing the voltages of video signals outputted to said display elements;

controlling means outputting control information for controlling said voltage varying means; and memory means storing the control information outputted from said controlling means.

4. A projected image displaying apparatus, comprising:

a projected image displaying unit which comprises:
voltage varying means for changing the voltages and of video signals outputted to display elements;
first controlling means outputting first control information for controlling said voltage varying means; and
memory means storing the first control information outputted from said first controlling means, and a chromaticity adjusting system which comprises:
chromaticity measuring means for measuring chromaticity of light output emitted by said projected image displaying unit; and
second controlling means outputting second controlling signals instructing said first controlling means to output first control information for controlling said voltage varying means, based on the measurement of chromaticity outputted from said chromaticity measuring means.

5. The projected image display apparatus according to claim 3, wherein the voltage varying means separately changes the amplitude voltages of the video signals and bias voltages.

6. The projected image display apparatus according to claim 4, wherein the voltage varying means separately changes the amplitude voltages of the video signals and bias voltages.

* * * * *